United States Patent
Park et al.

(10) Patent No.: US 10,795,594 B2
(45) Date of Patent: Oct. 6, 2020

(54) STORAGE DEVICE

(71) Applicant: SAMSUNG ELECTRONICS CO., LTD., Suwon-si, Gyeonggi-Do (KR)

(72) Inventors: Hyun-chul Park, Suwon-si (KR); Bo-mi Seok, Anyang-si (KR); Jun-ho Ahn, Hwaseong-si (KR); Ju-young Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 43 days.

(21) Appl. No.: 16/138,089

(22) Filed: Sep. 21, 2018

(65) Prior Publication Data

US 2019/0095117 A1  Mar. 28, 2019

(30) Foreign Application Priority Data

Sep. 22, 2017 (KR) .................. 10-2017-0122664

(51) Int. Cl.
*G06F 3/06* (2006.01)

(52) U.S. Cl.
CPC ............ *G06F 3/0634* (2013.01); *G06F 3/061* (2013.01); *G06F 3/0619* (2013.01); *G06F 3/0659* (2013.01); *G06F 3/0679* (2013.01)

(58) Field of Classification Search
CPC ...... G06F 3/0634; G06F 3/061; G06F 3/0659; G06F 3/0679; G06F 3/0619; G06F 3/0604
See application file for complete search history.

(56) References Cited

U.S. PATENT DOCUMENTS

| | | | |
|---|---|---|---|
| 6,279,114 B1* | 8/2001 | Toombs | G06F 12/1433 710/8 |
| 6,523,102 B1* | 2/2003 | Dye | G06F 12/08 711/170 |
| 7,243,185 B2 | 7/2007 | See et al. | |
| 7,343,445 B2 | 3/2008 | Katayama et al. | |
| 8,356,131 B2 | 1/2013 | Bolanowski | |
| 9,063,850 B2 | 6/2015 | Hyvonen et al. | |
| 9,170,943 B2 | 10/2015 | Camp et al. | |
| 9,619,175 B2 | 4/2017 | Chung et al. | |
| 2002/0039325 A1* | 4/2002 | Aizawa | G11C 16/32 365/233.1 |
| 2003/0079096 A1* | 4/2003 | Murakami | G06F 21/77 711/156 |

(Continued)

FOREIGN PATENT DOCUMENTS

KR   10-20140035776   3/2014

OTHER PUBLICATIONS

Embedded Multi-Media Card (e·MMC) Electrical Standard (5.1), 356 pages.

*Primary Examiner* — Hiep T Nguyen
(74) *Attorney, Agent, or Firm* — F. Chau & Associates, LLC

(57) ABSTRACT

A method of operating a storage device including a non-volatile memory includes receiving a write command from a host in a first state, receiving write data from the host in a second state, and transitioning an operation state from the second state to one of the first state and a third state based on a write mode chosen. The write command is received in the first state, and the received write data is programmed to the non-volatile memory in the third state.

19 Claims, 19 Drawing Sheets

(56) References Cited

U.S. PATENT DOCUMENTS

| | | | |
|---|---|---|---|
| 2005/0039058 A1* | 2/2005 | Yang | G06F 1/305 |
| | | | 713/300 |
| 2012/0179860 A1* | 7/2012 | Falanga | G11C 16/102 |
| | | | 711/103 |
| 2014/0082269 A1 | 3/2014 | Kang et al. | |
| 2015/0169449 A1* | 6/2015 | Barrell | G06F 12/0862 |
| | | | 711/143 |
| 2016/0188429 A1* | 6/2016 | Noguchi | G11C 29/52 |
| | | | 714/6.21 |
| 2017/0102754 A1* | 4/2017 | Chi | G11C 5/147 |
| 2019/0227708 A1* | 7/2019 | Hsieh | G06F 3/0607 |

\* cited by examiner

STORAGE DEVICE

CROSS-REFERENCE TO RELATED APPLICATION

This application claims priority from Korean Patent Application No. 10-2017-0122664, filed on Sep. 22, 2017, in the Korean Intellectual Property Office, and all the benefits accruing therefrom under 35 U.S.C. 119, the disclosure of which is incorporated by reference herein in its entirety.

TECHNICAL FIELD

The embodiments of the present invention relate to a storage device.

DISCUSSION OF RELATED ART

A flash memory, which is a non-volatile memory, may retain stored data even if power supply is interrupted. In recent years, storage devices having flash memories, such as an embedded multimedia card (eMMC), a universal flash storage (UFS), a solid-state drive (SSD), and a memory card, have widely been used to store or move large amounts of data.

SUMMARY

The embodiments of the present invention provide a storage device having improved write reliability and write performance and a method of operating the storage device.

According to an aspect of the embodiments of the present invention, there is provided a method of operating a storage device including a non-volatile memory. The method includes receiving a write command from a host in a first state, receiving write data from the host in a second state, and transitioning an operation state from the second state to one of the first state and a third state based on a write mode chosen. The write command is received in the first state, and the received write data is programmed to the non-volatile memory in the third state.

According to another aspect of the embodiments of the present invention, there is provided a method of operating an embedded multimedia card (eMMC) device including a non-volatile memory. The method includes receiving a write command from a host, receiving write data from the host, and deciding on one of a first write mode in which the storing of the write data in the non-volatile memory is not ensured and a second write mode in which the storing of the write data in the non-volatile memory is ensured to be a write mode. When the write mode is the first write mode, the method also includes transmitting a first state signal indicating a state capable of receiving the write command to the host after the reception of the write data is completed. When the write mode is the second write mode, the method also includes transmitting a second state signal indicating a state incapable of receiving the write command after the reception of the write data is completed.

According to another aspect of the embodiments of the present invention, there is provided a storage device including a non-volatile memory, and a device controller configured to decide on a write mode based on a condition including at least one of an operation mode chosen and a write command received without a defect and decide whether to enter into a programming state in which data is written to the non-volatile memory, based on the write mode.

BRIEF DESCRIPTION OF THE DRAWINGS

Embodiments of the present invention will be more clearly understood from the following detailed description taken in conjunction with the accompanying drawings in which.

DETAILED DESCRIPTION OF THE EMBODIMENTS

The inventive concept will now be described more fully hereinafter with reference to the accompanying drawings, in which embodiments of the inventive concept are shown. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout FIG. 1 is a block diagram of a storage system 1000 according to an embodiment of the present invention.

Figure 1:
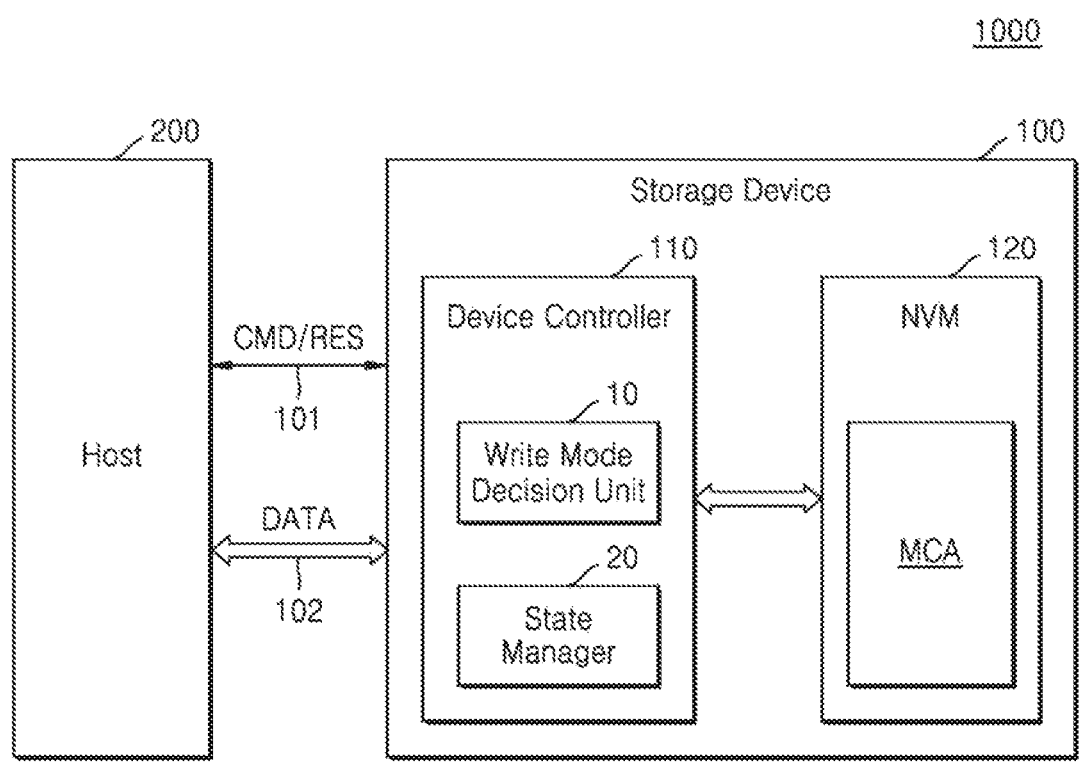
FIG. 1 is a block diagram of a storage system according to an embodiment of the present invention.

Referring to FIG. 1, the storage system 1000 may include a storage device 100 and a host 200.

The host 200 may refer to a data processing device capable of processing data, for example, a central processing unit (CPU), a processor, a microprocessor (MP), or an application processor (AP). The data processing device may be embedded or implemented in an electronic device. The electronic device may be implemented as, for example, a personal computer (PC), a data server, a network-attached storage (NAS). An Internet of Things (IoT) device, or a portable electronic device. The portable electronic device may be a laptop computer, a mobile phone, a smartphone, a table PC, a personal digital assistant (PDA), an enterprise digital assistant (EDA), a digital still camera, a digital video camera, an audio device, a portable multimedia player (PMP), a personal navigation device (PND), an MPEG-1 audio layer 3 (MP3) player, a handheld game console, e-book, and/or a wearable device. In an embodiment, the host 200 may be implemented as a System-on-Chip (SoC).

The host 200 may communicate with the storage device 100 through various interfaces and control a data processing operation (e.g., a data read operation or a data write operation) of the storage device 100.

A command CMD may be transmitted from the host 200 to the storage device 100 through a command channel 101, and a response RES to the command CMD may be transmitted from the storage device 100 to the host 200 through the command channel 101. Also, write data for a write operation may be transmitted from the host 200 to the storage device 100 through a plurality of data channels 102, while read data for a read operation may be transmitted from the storage device 100 to the host 200 through the plurality of data channels 102. In some embodiments, a signal (e.g., a busy signal) indicating a state of the storage device 100 may be provided to the host 200 through one of the plurality of data channels 102.

The storage device 100 may include a device controller 110 and a non-volatile memory 120. In some embodiments, the storage device 100 may be an internal memory embedded in an electronic device. For example, the storage device 100 may be an embedded multimedia card (eMMC), a solid-state drive (SSD), and/or a universal flash storage (UFS) memory device. In some embodiments, the storage device 100 may be an external memory attachable to/detachable from an electronic device. For example, the storage device 100 may be a memory card implemented as UFS, compact flash (CF), secure digital (SD), micro-secure digital (micro-SD), mini-secure digital (mini-SD), or extreme digital (xD). The storage device 100 may also be implemented as a memory stick in a suitable format or with a suitable specification. Hereinafter, for purposes of illustrating embodiments of the present inventive concept, an eMMC will be described as the storage device 100.

The device controller 110 may control data communication between the host 200 and the non-volatile memory 120. The device controller 110 may include a write mode decision unit 10 and a state manager 20.

The device controller 110 may support a cache function for an asynchronous I/O operation of the storage device 100. A cache-on mode in which a cache function is activated may be set based on a cache-on command provided from the host 200, while a cache-off mode in which the cache function is inactivated may be set based on a cache-off command. In some embodiments, the cache-off mode may be set as a default.

The write mode decision unit 10 may decide on a write mode based on a condition including at least one of whether the cache function is activated (i.e., whether the storage device 100 is in the cache-on mode or in the cache-off mode) and what write command is received from the host 200, and whether this write command is received without a defect. The write mode may include a reliability mode in which the storing of write data received from the host 200 in the non-volatile memory 120 is ensured and a performance mode in which the storing of the write data in the non-volatile memory 120 is not ensured. The write mode decision unit 10 may select the reliability mode to ensure that write data from the host 200 is properly written in the non-volatile memory 120. The write mode decision unit 10 may select the performance mode when as the write mode depending on whether the cache function is activated, whether the write command requests a forced program, and/or whether the write command is abnormal.

For example, when the cache function is inactivated or the write command requests the forced program or when there is a defect in the write command, the write mode decision unit 10 may select the reliability mode. When the cache function is activated, unless an exceptional case in which the forced program is requested or a result of processing of write data is to be provided to the host 200 occurs, the write mode decision unit 10 may select the performance mode. The above-described operations of the write mode decision unit 10 will be described in detail below with reference to FIGS. 7 to 9.

The state manager 20 includes a state machine that may be programmed to switch from one state to the next based on preset conditions of inputs. The state manager 20 may decide on an operation state of the storage device 100. In a specific operation state, when an operation corresponding to the operation state is completely performed or another processing operation is required, the state manager 20 may change the operation state into a different state. The state manager 20 may be implemented as a finite state machine. While the storage device 100 is performing a write operation, the state manager 20 may decide on one of three or more states to be the operation state of the storage device 100. The state manager 20 may determine the operation state of the storage device 100 based on the write mode decided by the write mode decision unit 10.

Figure 2:
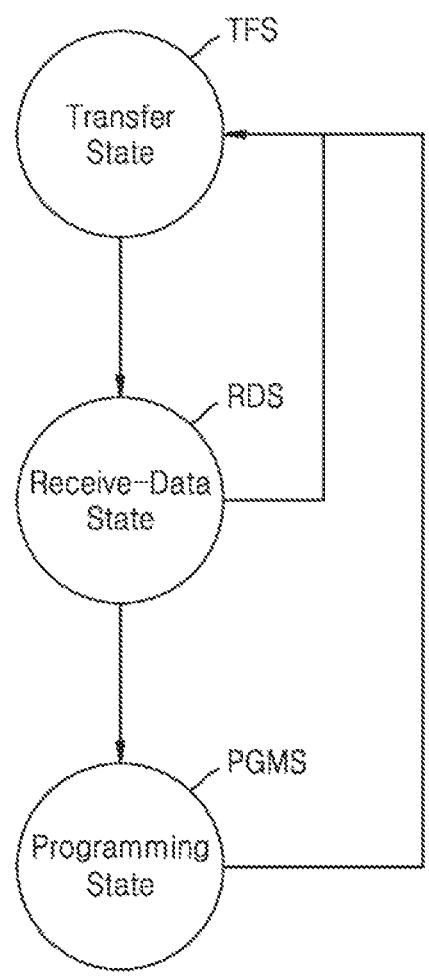
FIG. 2 is a state diagram of operation states of a storage device according to an embodiment of the present invention.

FIG. 2 is a state diagram of operation states of a storage device 100.

Referring to FIG. 2, the storage device 100 may process a write command based on a different number of states. For example, three states may be used: a transfer state TFS: receive-data state RDS: and a programming state PGMS. The transfer state TFS, the receive-data state RDS, and the programming state PGMS may be decided by the state manager 20. The transfer state TFS, the receive-data state RDS, and the programming state PGMS may be briefly referred to as a first state, a second state, and a third state, respectively, with each state being distinct from one another.

The storage device 100 may wait for a command (i.e., a write command) in the transfer state TFS and receive the command when the command is provided from the host 200. The storage device 100 may receive write data from the host 200 in the receive-data state RDS, and program the received write data to the non-volatile memory 120 in the programming state PGMS.

Referring to FIGS. 1 and 2, according to an embodiment of the present inventive concept, when the write command is received in the transfer state TFS and the reception of the write command is completed, the state manager 20 may change an operation state into the receive-data state RDS. When the reception of the write data is completed in the receive-data state RDS, the state manager 20 may decide on the next operation state based on a write mode decided by the write mode decision unit 10. In the reliability mode, since the write data is programmed to the non-volatile memory 120 or an operation of processing the write data is required, the state manager 20 may change the operation state from the receive-data state RDS to the programming state PGMS. When the programming of the write data is completed, the state manager 20 may change the operation state from the programming state PGMS to the transfer state TFS.

In the performance mode, since it does not matter if the programming of the write data to the non-volatile memory 120 is not ensured, the state manager 20 may change the operation state from the receive-data state RDS to the transfer state TFS to receive the next command.

Meanwhile, the completion of processing of a command may be protected by a state signal, for example, a busy signal. For example, when the reception of write data is completed, the device controller 110 may release a busy signal to indicate that the storage device 100 is in the transfer state TFS in which the processing of the command is completed and another command may be received. Also, the device controller 110 may set the busy signal to indicate that the storage device 100 is in the programming state PGMS, and as such is capable of processing (or executing) a command. The storage device 100 may transmit a first state signal to the host 200 to notify the host 200 that the busy signal has been released. By contrast, the storage device 100 may transmit a second state signal to the host 200 to notify the host 200 that the busy signal has been set. Setting the busy signal may be referred to as 'busy set', while releasing the busy signal may be referred to as 'busy clear'.

When the operation state of the storage device 100 transitions from the receive-data state RDS to the programming state PGMS, the busy signal may be set. Subsequently, when the operation state of the storage device 100 transitions from the programming state PGMS to the transfer state TFS, the busy signal may be released. When the operation state of the storage device 100 transitions from the receive-data state RDS to the transfer state TFS after the reception of the write data, the busy signal may be directly released.

If the busy signal has not been released, the storage device 100 may not be in transition to the transfer state TRS. In this case, when the host 200 issues a command related to an I/O operation, the storage device 100 may decide that the command is an illegal command, and process an error.

The non-volatile memory 120 may include a memory cell array MCA. In an embodiment, the memory cell array MCA may include a plurality of flash memory cells. For example, the plurality of flash memory cells may be NAND flash memory cells. However, the embodiments of the present invention are not limited thereto, and the memory cells may be resistive memory cells, such as resistive RAM (ReRAM) cells, phase-change RAM (PRAM) cells, and magnetic RAM (MRAM) cells.

In an embodiment, a memory cell array MCA may be a three dimensional (3D) memory array. The 3D memory array may be monolithically formed in at least one physical level of arrays of memory cells having an active area located above a silicon substrate and a circuit associated with operations of the memory cells, whether the associated circuit is above or within the silicon substrate. The term "monolithic" may mean that layers of each level of the array are directly stacked on the layers of each lower level of the array. In an embodiment, the 3D memory array may include vertical NAND strings such that at least one memory cell is located over another memory cell in a vertical direction. The at least one memory cell may include a charge trap layer.

U.S. Pat. Nos. 7,679,133, 6,553,466, 8,654,587, and 8,559,235, and U.S. Patent Application Publication No. 2011/0233648 describe various configurations of 3D memory arrays usable as a memory cell array MCA according to at least one embodiment of the present invention. These patents and patent are incorporated by reference herein.

Figure 3A:
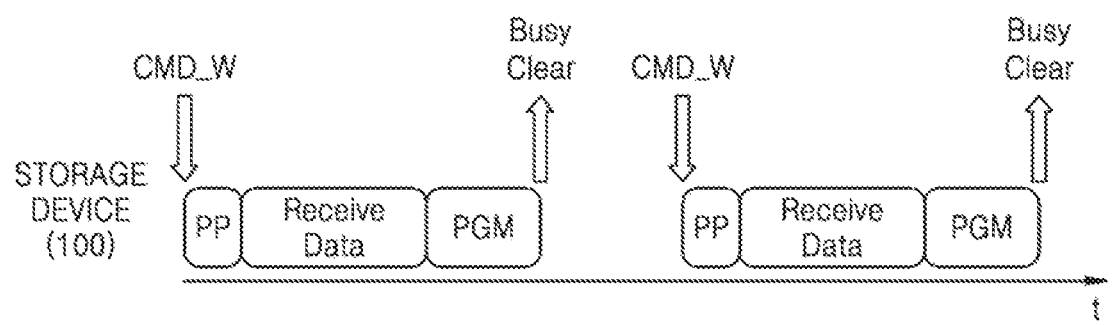
FIGS. 3A and 3B are timing diagrams of a storage device of FIG. 1 according to an embodiment of the present invention.
Figure 3B:
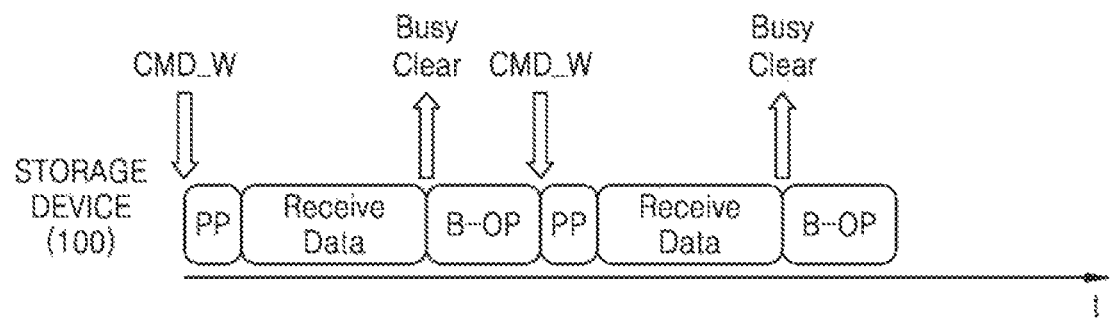

FIGS. 3A and 3B are timing diagrams of the storage device 100 of FIG. 1. FIG. 3A is a timing diagram in a reliability mode, and FIG. 3B is a timing diagram in a performance mode.

Referring to FIG. 3A, in the reliability mode, the storage device 100 may perform a synchronous input/output (I/O) processing operation to ensure the programming of data. When a write command CMD_W is received from the host 200, the storage device 100 may prepare to receive data. For example, the storage device 100 may assign a region in which data is to be stored, from among regions of a data buffer included in the storage device 100. Thereafter, when write data is received and the reception of the write data is completed, the storage device 100 may enter into the programming state (e.g., PGMS in FIG. 2). The received write data may be programmed to the non-volatile memory (e.g., 120 in FIG. 1), and the storage device 100 may release a busy signal after the programming of the received write data is completed, and enter into the transfer state (e.g., TFS in FIG. 2).

The storage device 100 may provide the release of a busy signal (i.e., 'busy clear') to the host (e.g., 200 in FIG. 1). The host 200 may confirm that the busy signal is released, and prepare for the next I/O processing operation. After the busy signal is released, the storage device 100 may receive the next command (e.g., a write command CMD_W) from the host 200 after a predetermined amount of time.

Referring to FIG. 3B, the storage device 100 may perform an asynchronous I/O processing operation in a performance write mode. In the performance mode, when the reception of the write data is completed, the storage device 100 may directly release the busy signal and enter into the transfer state TFS. The host 200 may conform that the busy signal is released, and prepare for the next I/O processing operation.

The storage device 100 may perform a background operation or wait to receive the next command from the host 200 until the next command (e.g., the write command CMD_W) is received from the host 200. The background operation may be an operation that may be performed irrespective of the write command CMD_W received from the host 200. For example, the background operation may include an operation of programming data corresponding to a program unit to the non-volatile memory 120 when the data corresponding to the program unit is stored in the data buffer that operates as a cache, i.e., the data buffer is full.

As described above, the storage device 100 according to the embodiment of the present invention may decide on a write mode depending on whether the storing of the write data in the non-volatile memory 120 is to be ensured (i.e., in consideration of data integrity) based on a condition including at least one of whether a cache function is activated information provided by the write command CMD_W and whether the write command CMD_W is received without a defect. In some embodiments, this condition for deciding on the write mode may further include whether the write data is received without error. When the reception of the write data is completed, the storage device 100 may change an operation state into one of the programming state PDMS or the transfer state TFS based on the decided write mode. Therefore, the storage device 100 may adaptively control a change of operation state depending on whether the integrity of write data is required, thus improving write reliability and write performance. Also, since the storage device 100 is capable of an asynchronous I/O processing operation, data processing performance of the storage system 1000 may be enhanced.

Figure 4:
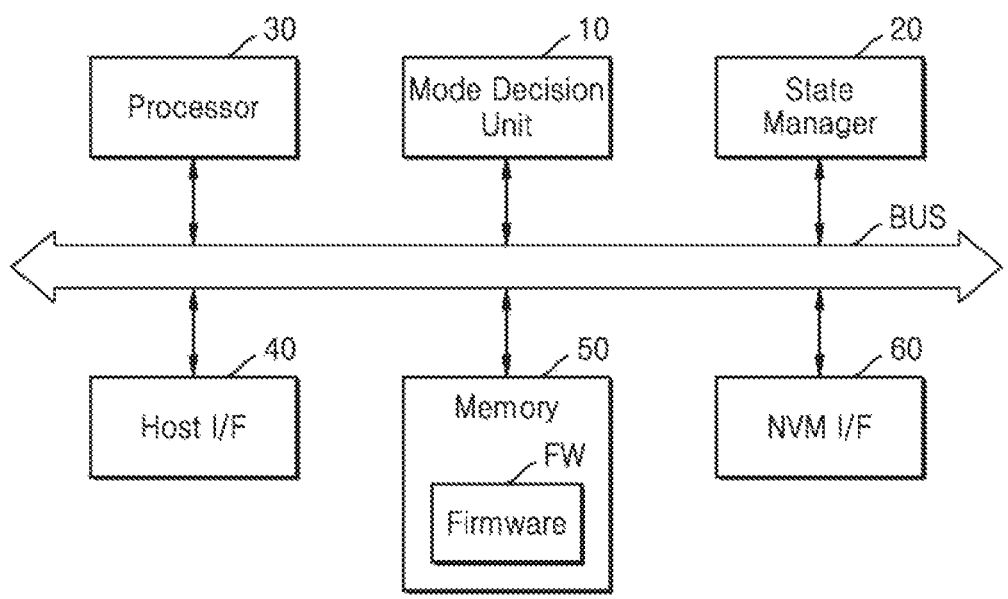
FIG. 4 is a detailed block diagram of a device controller included in the storage device of FIG. 1 according to an embodiment of the present invention.

FIG. 4 is a detailed block diagram of a device controller 110 included in the storage device of FIG. 1.

Referring to FIG. 4, the device controller 110 may include a processor 30, a write mode decision unit 10, a state manager 20, a host interface 40, a memory 50, and a non-volatile memory interface 60. In some embodiments, in the device controller 110, the processor 30, the write mode decision unit 10, the state manager 20, the host interface 40, the memory 50, and the non-volatile memory interface 60 may communicate with one another via a bus BUS.

The processor 30 may include a CPU or an MP and control overall operations of the device controller 110.

The write mode decision unit 10 may decide on a write mode based on a condition including at least one of whether a cache function is activated, whether a write command is received without a defect, and information provided by is the write command. The write mode decision unit 10 may be embodied by hardware, software (or firmware), or a combination of hardware and software. When the write mode decision unit 10 is embodied by software or firmware, the write mode decision unit 10 may be loaded into the memory 50 and operate under the control of the processor 30.

The state manager 20 may decide on an operation state and decide whether to enter into a program state based on a chosen write mode during a write operation. After the reception of write data is completed in a receive-data state, the state manager 20 may decide whether the operation state is to be changed into the program state or a transfer state, based on the write mode. The state manager 20 may be embodied by hardware, software (or firmware), or a combination of hardware and software. When the state manager 20 is embodied by software or firmware, the state manager 20 may be loaded into the memory 50 and operate under the control of the processor 30.

The memory 50 may be used as an operation memory, a buffer memory, or a cache memory. For example, the memory 50 may be embodied by a volatile memory, such as dynamic RAM (DRAM), static RAM (SRAM), synchronous DRAM (SDRAM), or a non-volatile memory, such as phase-change RAM (PRAM), magnetic RAM (MRAM), resistive RAM (RRAM), ferroelectric RAM (FeRAM), and flash memory. Firmware may be loaded into the memory 50.

The host interface 40 may provide an interface between the host 200 and the device controller 110. In some embodiments, such interface may be implemented with a universal serial bus (USB), a man machine communication (MMC), a peripheral component interconnect-express (PCI-E), an advanced technology attachment (ATA), a serial advanced technology attachment (SATA), a parallel advanced technology attachment (PATA), a small computer system interface (SCSI), a serial attached SCSI (SAS), an enhanced small device interface (ESDI), or an integrated drive electronics (IDE).

The non-volatile memory interface 60 may provide an interface between the device controller 110 and the non-volatile memory 120. In a write operation, the non-volatile memory interface 60 may write (i.e., program) data temporarily stored in the memory 50 into the non-volatile memory 120 under the control of the processor 30. In a read operation, the non-volatile memory interface 60 may read data from the non-volatile memory 120 under the control of the processor 30 and temporarily store the read data in the memory 50.

Figure 5:
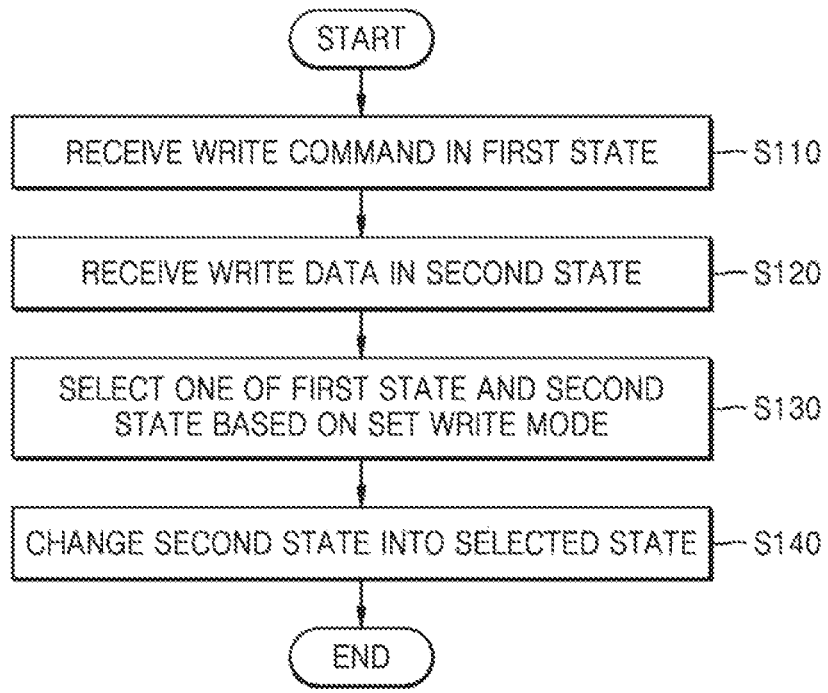
FIG. 5 is a flowchart of a method of operating a storage device according to an embodiment of the present invention.

FIG. 5 is a flowchart of a method of operating a storage device 100 according to an embodiment of the present invention. The method of operating the storage device 100 according to the embodiment of the present invention may be a method of deciding a transition order of an operation state of the storage device 100 when a write operation is performed in the storage device 100. For example, the method of operating the storage device 100 may include operations performed in a temporal sequence in the storage device 100 of FIG. 1. Descriptions presented above with reference to FIGS. 1 and 4 may also be applied to the present embodiment, and repeated descriptions will be omitted. Hereinafter, the method of operating the storage device 100 will be described with reference to FIGS. 1 and 5.

Referring to FIG. 5, in a first state, the storage device 100 may receive a write command (S110). The first state may be a transfer state (e.g., TFS in FIG. 2). For example, when the state manager 20 sets the operation state as the transfer state, the storage device 100 may receive a write command from the host 200. In the transfer state, the storage device 100 may receive the write command from the host 200 and process the write command. When the storage device 100 is not in the transfer state, however, if the storage device 100 receives the write command from the host 200, the storage device 100 may determine the write command as an illegal command and process an error.

In a second state, the storage device 100 may receive write data (S120). The second state may be a receive-data state (e.g., RDS in FIG. 2). If the reception of the write command is completed while in the transfer state, the state manager 20 may transition the operation state to the receive-data state as the next operation state, and the storage device 100 may receive write data from the host 200. The write data may be stored in a data buffer included in the storage device 100.

The storage device 100 may select one of the first state and a third state based on a chosen write mode (S130). The third state may be a program state (e.g., PGMS in FIG. 2). For example, when the reception of the write data is completed while in the receive-data state, the state manager 20 may decide on one of the transfer state TFS and a program state PGMS to be the next operation state based on the write mode chosen. As described with reference to FIG. 1, the state manager 20 may decide on the program state PGMS to be the next operation state when the write mode chosen is a reliability mode, and decide on the transfer state TFS to be the next operation state when the write mode chosen is a performance mode.

The storage device 100 may transition from the second state to a selected state (i.e., one of the first state and the third state) (S140). For example, the state manager 20 may change the operation state from the receive-data state RDS in which the storage device 100 may receive write data, to one of the transfer state TFS and the programming state PGMS.

When the write mode chosen is the performance mode, the operation state may transition to the transfer state TFS, and the storage device 100 may wait to receive a write command from the host 200. After the operation state transitions to the transfer state TFS, the storage device 100 may release a busy signal indicating that a command is being processed, and notify the host 200 that the busy signal has been released and that the storage device 100 is in a state capable of receiving a write command.

When the write mode chosen is the reliability mode, the operation state may transition to the programming state PGMS, and the storage device 100 may program write data stored in the data buffer to the non-volatile memory (e.g., 120 in FIG. 1). Subsequently, when the programming of the write data is completed while in the programming state, the operation state may transition to the transfer state TFS as the next operation state, and the busy signal may be released.

Figure 6:
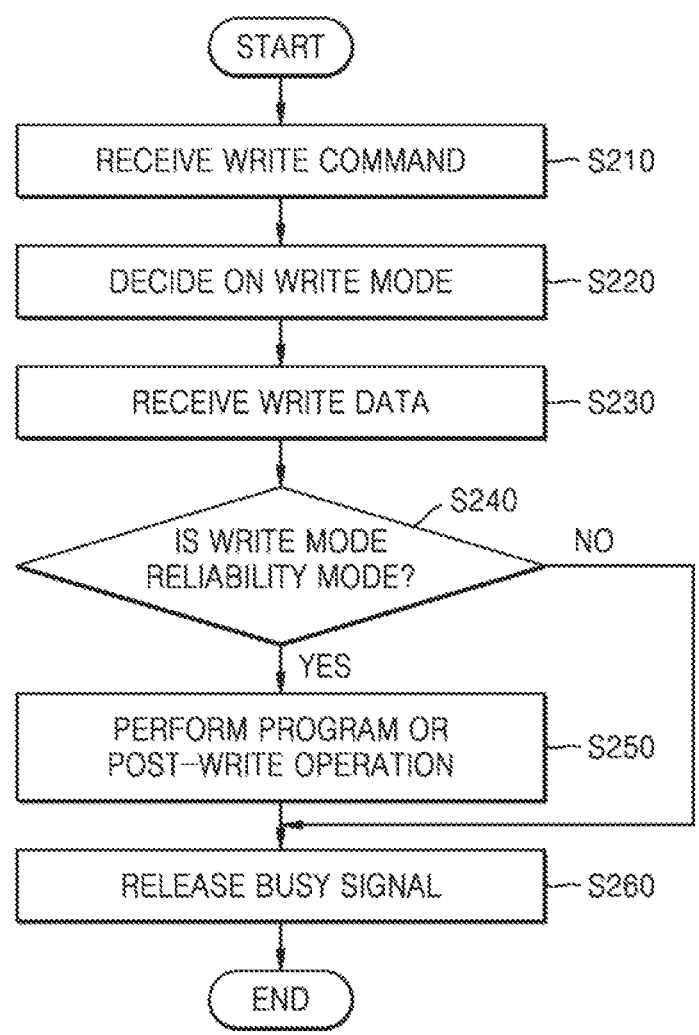
FIG. 6 is a flowchart of a method of operating a storage device according to an embodiment of the present invention.

FIG. 6 is a flowchart of a method of operating a storage device 100 according to an embodiment of the present invention. The method of operating the storage device according to the embodiment of the present invention may be a method of performing a write operation in the storage device 100. For example, the method of operating the storage device 100 may include operations performed in a temporal sequence in the storage device 100 of FIG. 1. Descriptions presented above with reference to FIGS. 1, 4, and 5 may also be applied to the present embodiment, and repeated descriptions will be omitted. Hereinafter, the method of operating the storage device 100 will be described with reference to FIGS. 1 and 6.

Referring to FIG. 6, the storage device 100 may receive a write command (S210). The storage device 100 may receive a write command from the host 200 while the storage device 100 is in the transfer state (e.g., TFS in FIG. 2).

The storage device 100 may decide on a write mode (S220). The storage device 100 may decide on the write mode based on a condition including at least one of whether a cache function is activated, whether a write command is received without a defect, and information provided by the write command. The write mode may be decided between a reliability mode in which the storing of write data in a non-volatile memory 120 is ensured and a performance mode in which the storing of the write data in the non-volatile memory 120 is not ensured. A method of deciding on the write mode will be described in detail below with reference to FIGS. 7 to 9.

The storage device 100 may receive write data (S230). After the reception of the write command is completed, the storage device 100 may transition from the transfer state TFS to a receive-data state RDS, and receive the write data in the receive-data state RDS. The write data may be temporarily stored in the data buffer.

The storage device 100 may decide whether the write mode is the reliability mode (S240). Subsequently, the storage device 100 may perform a different operation based on the decision result.

If the write mode decided in operation S220 is not the reliability mode (e.g., the write mode is the performance mode), the storage device 100 may release a busy signal (S260). The storage device 100 may transition from the receive-data state RDS to the transfer state TFS and release the busy signal. The releasing of the busy signal may notify the host 200 of a state capable of receiving an I/O command.

If the write mode decided in operation S220 is the reliability mode, the storage device 100 may perform a program or a post-write operation (S250). The storage device 100 may transition from the receive-data state RDS to the programming state PGMS. The storage device 100 may program the received write data, which is temporarily stored in a data buffer, to the non-volatile memory 120. The storage device 100 may also perform the post-write operation. For instance, when an error occurs in the write command or when an error occurs during the programming of the write data to the non-volatile memory 120, the storage device 100 may perform the post-write operation to process the write data or notify the host 200 of the occurrence of the error later.

Thereafter, if the program or the post-write operation is completed, the storage device 100 may transition from the programming state PGMS to the transfer state TFS, and release the busy signal. The releasing of the busy signal may notify the host 200 of a state capable of receiving the I/O command (S260).

Although FIG. 6 illustrates a case in which the operation S220 of deciding on the write mode is performed after the operation S210 of receiving the write command, the embodiments of the present invention are not limited thereto. In some embodiments, the operation S220 of deciding on the write mode may be performed before the operation S210 of receiving the write command or after the operation S230 of receiving the write data.

Figure 7:
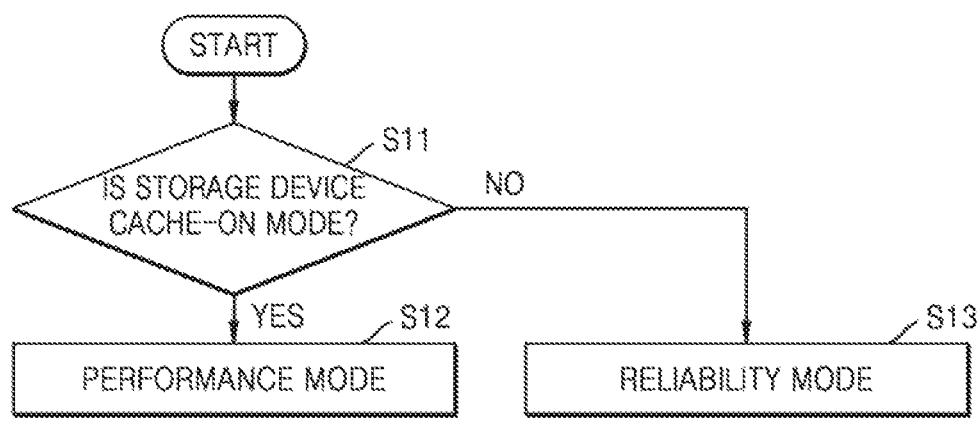
FIGS. 7 to 9 are flowcharts of a method of deciding on a write mode according to embodiments of the present invention.
Figure 8:
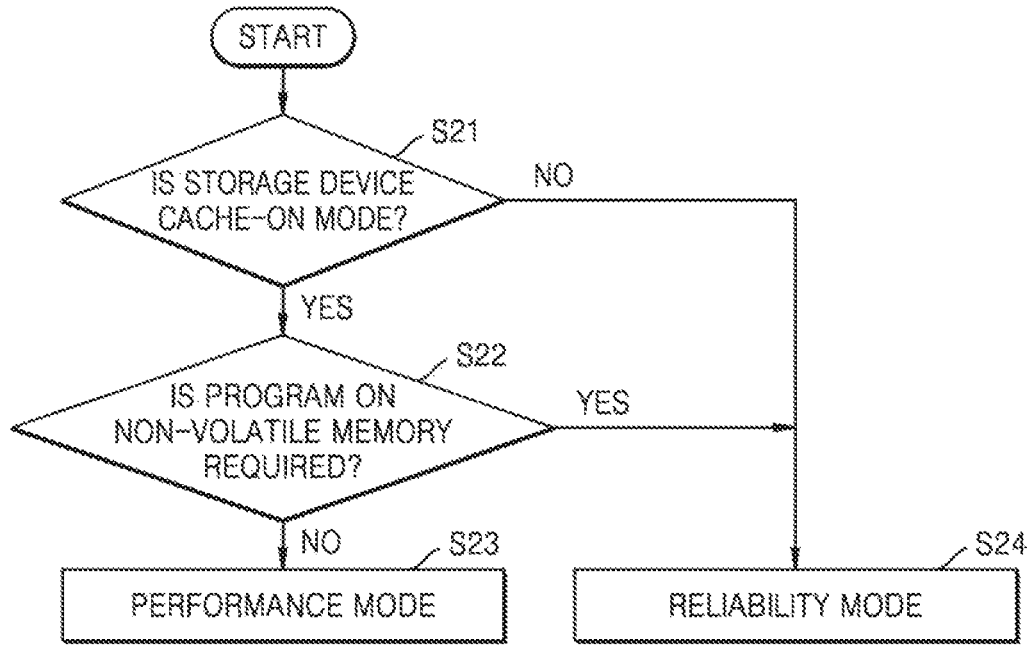
Figure 9:
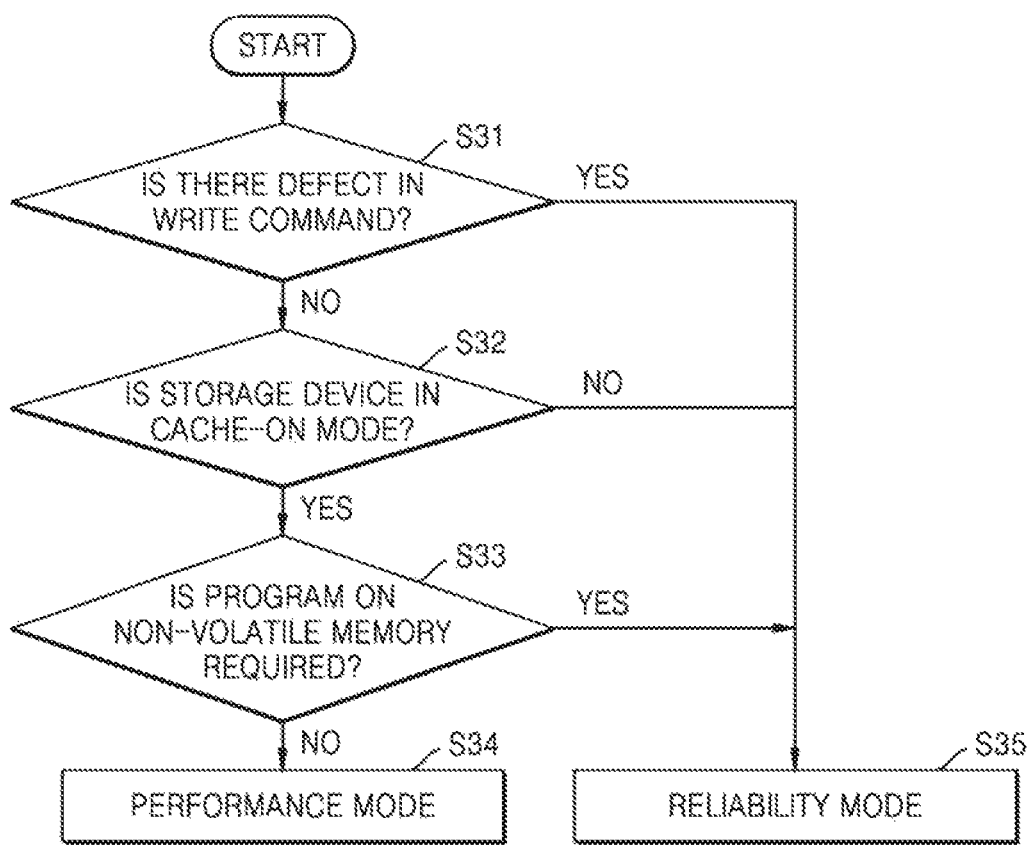

FIGS. 7 to 9 are flowcharts of a method of deciding on a write mode according to embodiments of the present invention. The method of deciding on the write mode shown in FIGS. 7 to 9 may be performed in operation S220 of FIG. 6. Hereinafter, the method of deciding on the write mode will be described with reference to FIGS. 1 and 7 to 9, and repeated descriptions thereof will be omitted.

Referring to FIG. 7, a write mode decision unit 10 of a storage device 100 may decide whether the storage device 100 is in a cache-on mode (S11). As described above with reference to FIG. 1, a cache-on mode in which a cache function is activated may be set based on a cache-on command provided from a host 200. For example, the storage device 100 may store a data value indicating the cache-on mode in an internal register or the memory (e.g., 50 in FIG. 2), and the write mode decision unit 10 may confirm the data value and confirm whether the storage device 100 is in the cache-on mode.

If the storage device 100 is in the cache-on mode, since the integrity of write data is not required, the write mode decision unit 10 may decide on a performance mode to be the write mode of the storage device 100 (S12). If the storage device 100 is not in the cache-on mode (e.g., the storage device 100 is in a cache-off mode), the write mode decision unit 10 may decide on a reliability mode to be the write mode of the storage device 100 (S13), since the integrity of the write data is required.

Referring to FIG. 8, the write mode decision unit 10 of the storage device 100 may decide whether the storage device 100 is in a cache-on mode (S21). If the storage device 100 is not in the cache-on mode (e.g., the storage device 100 is in the cache-off mode), the write mode decision unit 10 of the storage device 100 may decide on the reliability mode to be the write mode of the storage device 100 (S24).

If the storage device 100 is in the cache-on mode, the write mode decision unit 10 may decide Whether a program on a non-volatile memory is required (S22). The write mode decision unit 10 may decide whether the program is required, based on a write command. For instance, when the write command is a command that requests to program data into the non-volatile memory, such as reliable write or forced write, the write mode decision unit 10 may decide that the program on the non-volatile memory is required.

If it is decided that the program is required, the write mode decision unit 10 may decide on the reliability mode to be the write mode of the storage device 100 (S24). If it is decided that the program is not required, the write mode decision unit 10 may decide on the performance mode to be the write mode of the storage device 100 (S23).

Referring to FIG. 9, the write mode decision unit 10 may decide on a write mode depending on whether there is a defect in a write command.

The write mode decision unit 10 may decide whether there is a defect in the received write command (S31). For example, when a normally unprocessable write command is received, for example, when a write command includes an undecodable command argument or when an address included in the write command does not correspond to a storage region of the non-volatile memory 120, the write mode decision unit 10 may decide that there is the defect in the write command.

If it is decided that there is a defect in the write command, the write mode decision unit 10 may decide on a reliability mode to be the write mode of the storage device 100 (S35). If it is decided that there is no defect in the write command, the write mode decision unit 10 may subsequently decide on the write mode by deciding whether the storage device 100 is in a cache-on mode (S32) and deciding whether a program on the non-volatile memory 120 is required (S33). Operations S32 and S33 are the same as operations S21 and S22 of FIG. 8, repeated descriptions thereof will be omitted.

If it is decided that there is no defect in the write command, the storage device 100 is in the cache-on mode, and the program on the non-volatile memory 120 is not required, the write mode decision unit 10 may decide on a performance mode to be the write mode of the storage device 100 (S35).

Thus far, the methods of deciding on the write mode have been described with reference to FIGS. 7 to 9. However, the methods shown in FIGS. 7 to 9 according the present embodiments pertain to only examples and may be variously changed.

Figure 10:
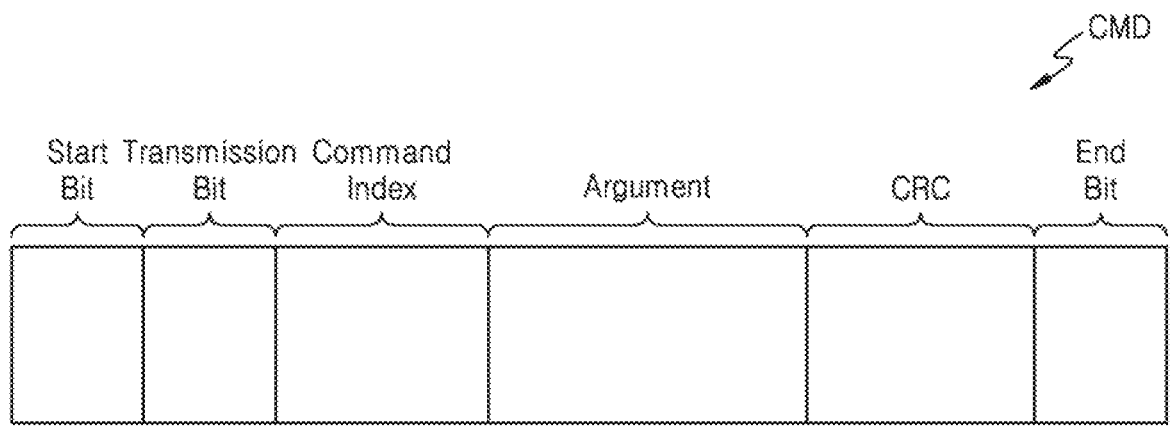
FIG. 10 is a construction diagram of a command received by a storage device, according to an embodiment of the present invention.

FIG. 10 is a construction diagram of a command CMD received by a storage device, according to an embodiment of the present invention.

Referring to FIG. 10, the command CMD may include a plurality of bits, for example, a start bit, a transmission bit, a command index, a command argument, cyclical redundancy check (CRC), and an end bit.

The start bit may be a bit indicating the start of the command CMD. The start bit may be, for example, fixed to 0. The transmission bit may be a bit indicating a subject that has issued the command CMD. For example, the transmission bit may be 1 to indicate that the command CMD is a command issued by the host 200. The command index may include a plurality of bits indicating the kind of the command CMD to indicate a specific command from among a plurality of commands that may be performed by the storage device 100. For example, when the command index is CMD 1, the command CMD may be a write command; alternatively, when the command index is CMD 2, the command CMD may be a read command. Accordingly, the storage device 100 may detect which command is to be input according to the command index and perform an operation corresponding to the command index.

The command argument may include information required to perform the operation in response to the command CMD. For example, when the command CMD is a read command or a write command, the command argument may include start address information of the memory cell array (e.g., MCA in FIG. 1) of the non-volatile memory (e.g., 120 in FIG. 1) on which a read or write operation is to be performed and information about a data size of read data or write data. Also, when the command CMD is the write command, the command argument may include information about reliability write or forced write (e.g., information indicating whether data according to the write command should be programmed into the non-volatile memory).

The CRC may serve to detect an error that may occur during the transmission of the command CMD. For example, the CRC may be embodied by 7 bits. The end bit may be a bit indicating the end of the command CMD. The end bit may be, for example, fixed to 1.

For example, when the command CMD is received through a command channel 101, a transmission error may occur so that one or more bits (e.g., the command argument or the CRC) of the command CMD may be changed. When an error cannot be detected by the CRC, the storage device 100 may not normally process the write command. Alternatively, when the host 200 sets a wrong command argument or a wrong address, the storage device 100 may not normally process the write command.

Figure 11:
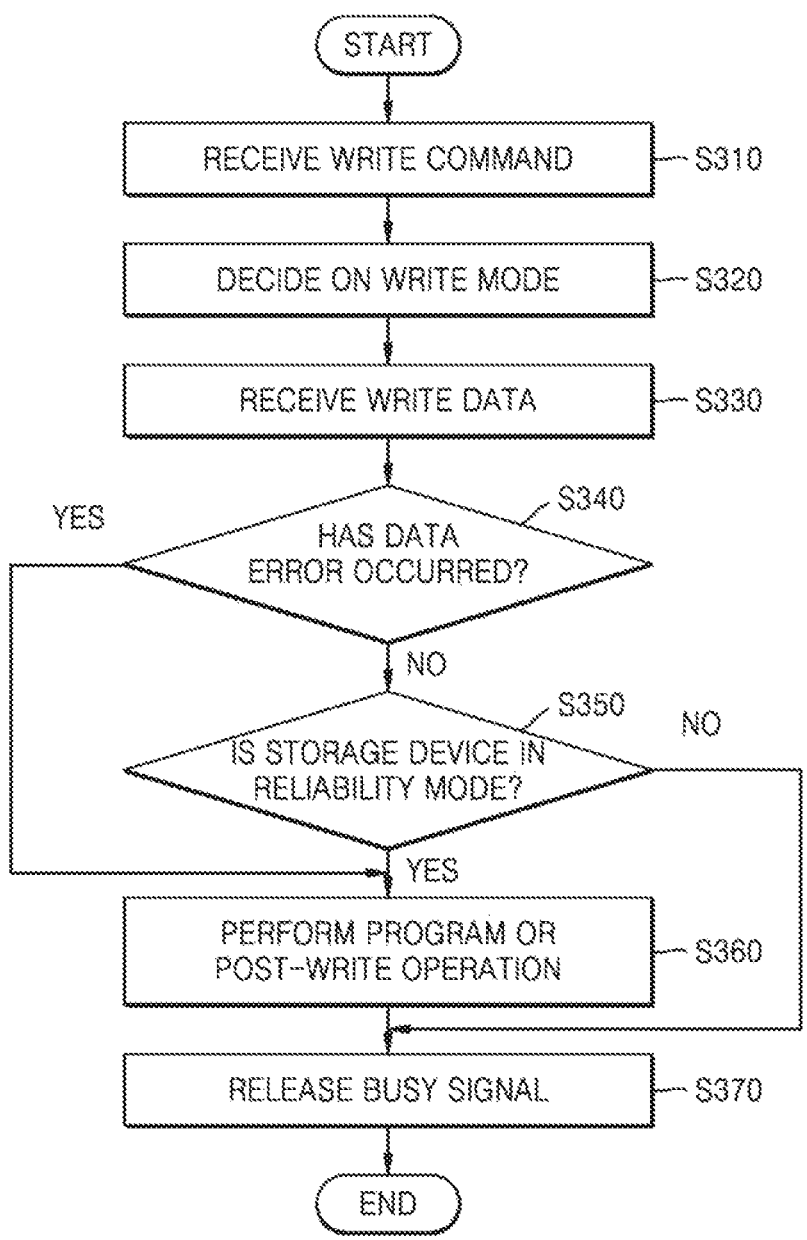
FIG. 11 is a flowchart of a method of operating a storage device according to an embodiment of the present invention.

FIG. 11 is a flowchart of a method of operating a storage device 100 according to an embodiment of the present invention. The method of operating the storage device 100 according to the embodiment of the present invention refers to a method of performing a write operation in the storage device 100. For example, the method may include operations performed in a temporal sequence in the storage device 100 of FIG. 1. The method of operating the storage device according to the embodiment of the present invention may be similar to the method of operating the storage device described with reference to FIG. 6. Hereinafter, differences between the method of FIG. 11 and the method of FIG. 6 will mainly be described with reference to FIGS. 1 and 11.

Referring to FIG. 11, the storage device 100 may receive a write command while the storage device 100 is in a transfer state (e.g., TFS in FIG. 2) (S310), and decide on a write mode (S320). After the reception of the write command is completed, the storage device 100 may transition from the transfer state TFS to a receive-data state RDS, and receive write data in the receive-data state RDS (S330).

Subsequently, the storage device 100 may decide whether a data error has occurred in the received write data (S340). For example, the storage device 100 may detect and correct an error based on a CRC included in the write data, and decide whether an uncorrectable error has occurred in the write data.

If it is decided that the error has occurred in the write data, the storage device 100 may perform a program or a data post-processing operation (S360). The storage device 100 may transition from the receive-data state RDS to the programming state PGMS. In some embodiments, if it is decided that the error has occurred in the write data, the storage device 100 may change the write mode into a reliability mode.

If it is decided that the error has not occurred in the write data, the storage device 100 may decide whether the write mode is the reliability mode (S350). Alternatively, after an error occurs in the write data and the write mode is changed, the storage device 100 may decide whether the write mode is the reliability mode.

If the write mode is the reliability mode, the storage device 100 may perform a program or a data post-processing operation (S360). If the write mode is not the reliability mode (e.g., the write mode is a performance write mode), a busy signal may be released (S370). The storage device 100 may transition from the receive-data state RDS to the transfer state TFS.

Thus, after the reception of the write data is completed, the storage device 100 may enter into the transfer state TFS or the programming state PDMS based on a write mode chosen and a decision on data integrity.

Figure 12:
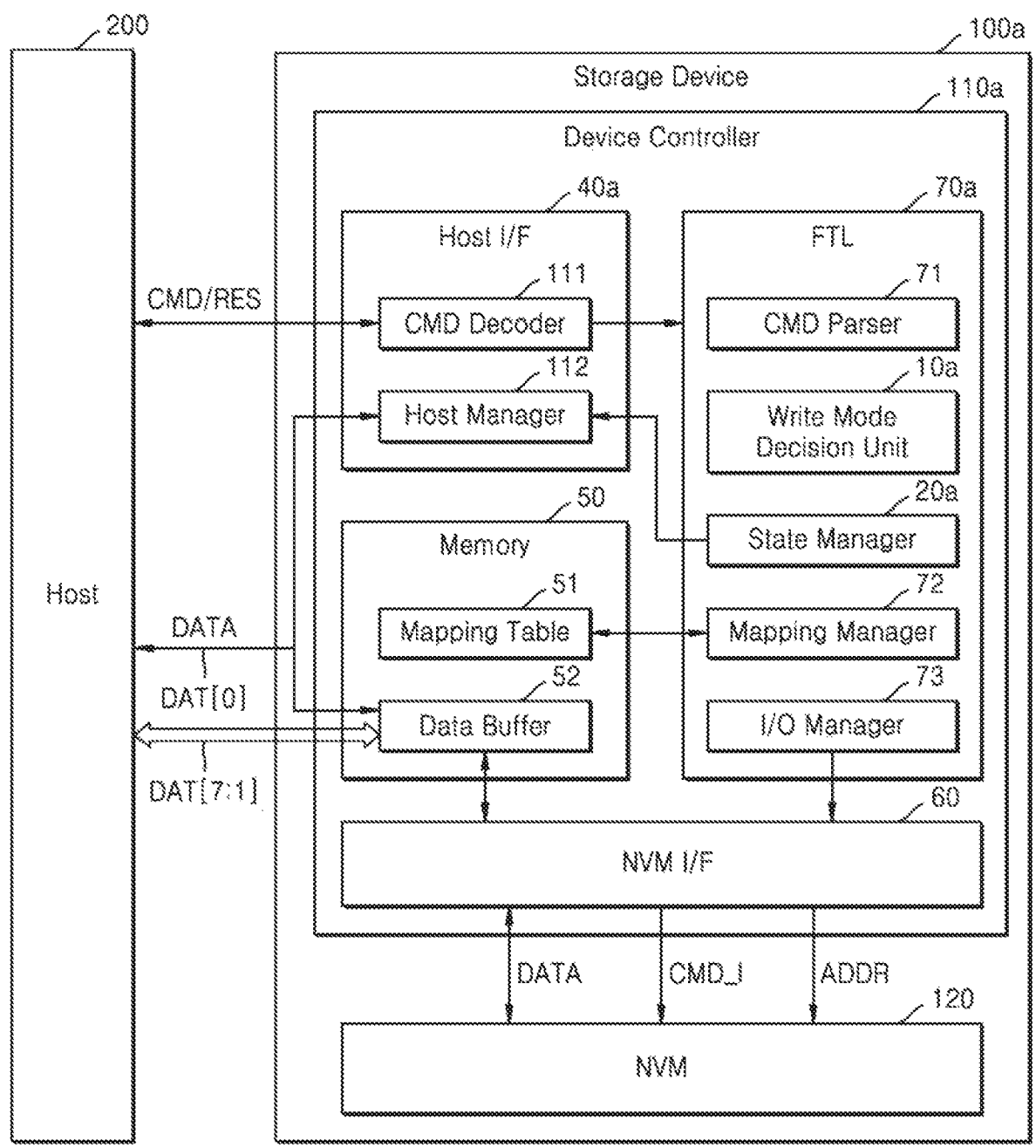
FIG. 12 is a detailed block diagram of a storage device according to an embodiment of the present invention.

FIG. 12 is a detailed block diagram of a storage device 100a according to an embodiment of the present invention.

Referring to FIG. 12, the storage device 100a may include a device controller 110a and a non-volatile memory 120, and the device controller 110a may include a flash translation layer (hereinafter, referred to as an 'FTL') 70a, a memory 50, a host interface 40a, and a non-volatile memory interface 60. The storage device 100a may correspond to an embodied example of the storage device 100 of FIG. 1, and the device controller 110a may correspond to an embodied example of the device controller 110 of FIG. 4. Accordingly, descriptions presented above with reference to FIGS. 1 and 4 may also be applied to the present embodiment. In the present embodiment, the storage device 100a may be an eMMC device, but the embodiments of the present invention are not limited thereto.

The host interface 40a may include a command decoder 111 and a host manager 112. The command decoder 111 may decode a command CMD received from the host 200, and transmit the decoded command to the FTL 70a.

The host manager 112 may manage the transceiving of data to and from the host 200 and the transmission of a busy signal to the host 200. In an exemplary embodiment, the busy signal may be transmitted to the host 200 through one of a plurality of data channels to which data DATA is transmitted. For example, as shown in FIG. 12, when data is transceived through first to eighth data channels DAT[7:0], the host manager 112 may drive a signal '0' (e.g., a low level) in a pulling-down manner through one data channel (e.g., the first data channel DAT[0]) of the first to eighth data channels DAT[7:0]) to notify the host 200 that the busy signal has been set, and drive a signal '1' (e.g., a high level) through the first data channel DAT[0] to notify the host 200 that the busy signal has been released. However, the embodiments of the present invention are not limited thereto, and the host manager 112 may transmit the busy signal to the host 200 through an additional channel that is distinguished from the data channels.

The memory 50 may include a data buffer 52, and a mapping table 51 may be loaded into the memory 50. For example, a region (or a memory chip) of the memory 50 may operate as the data buffer 52, and the mapping table 51 may be loaded into another region (or another memory chip). The mapping table 51 may include mapping information between a logical address and a physical address of received data DATA (write data or read data). The mapping table 51 is stored in the non-volatile memory device 120 and may be loaded into the memory 50 from the non-volatile memory device 120 when the storage device 100a is operating. The data buffer 52 may temporarily store the received data DATA (write data or read data). The data buffer 52 receives write data from the host 200 or transmits read data to the host 200 under the control of the host manager 112.

Since firmware is executed by the processor (e.g., 30 in FIG. 4), the FTL 70a may be embodied in software. In an embodiment, the FTL 70a may be loaded into the memory 50 and executed by the processor 30. In an embodiment, the FTL 70a may be loaded into a first memory chip, and the memory 50 may be a second memory chip.

The FTL 70a may include a command parser 71, a mapping manager 72, and an I/O manager 73 and further include a write mode decision unit 10a and a state manager 20a. In the present embodiment, the FTL 70a (e.g., firmware) may decide on a write mode, and the firmware may decide on an operation state and request the host manager 112 to release a busy signal.

The command parser 71 may process a command and a command argument, which are received from the host interface 40a, and confirm the integrity of the command. The mapping manager 72 may manage mapping between a logical address and a physical address of data (write data or read data). A physical address on the non-volatile memory 120 may be assigned by the mapping manager 72 to the I/O) manager 73. The I/O manager 73 may request the non-volatile memory 120 to program write data temporarily stored in the data buffer 52 or read the stored data via the non-volatile memory interface 60.

As described above, the write mode decision unit 10a may decide on a write mode based on a condition including at least one of whether a cache function is activated (i.e., whether the storage device 100a is in a cache-on mode or a cache-off mode) and information provided by a write command received from the host 200 without a defect. The state manager 20a may decide on the operation state of the storage device 100a based on the write mode decided by the write mode decision unit 10a. The state manager 20a may request the host manager 112 to set a busy signal if the operation state is a programming state (e.g., PDMS in FIG. 2), and request the host manager 112 to release the busy signal if the operation state is a transfer state (e.g., TFS in FIG. 2). The host manager 112 may set the busy signal or release the busy signal upon a request of the state manager 20a.

The non-volatile memory interface 60 may provide an interface between the device controller 110 and the non-volatile memory 120 and be implemented with, for example, a flash interface layer (FIL). The non-volatile memory interface 60 may provide an internal command CMD_I, which is issued based on the command CMD received from the host 200, and an address ADDR (e.g., a physical address) to the non-volatile memory 120 and write data DATA to the non-volatile memory 120 or read the data DATA from the non-volatile memory 120.

Figure 13A:
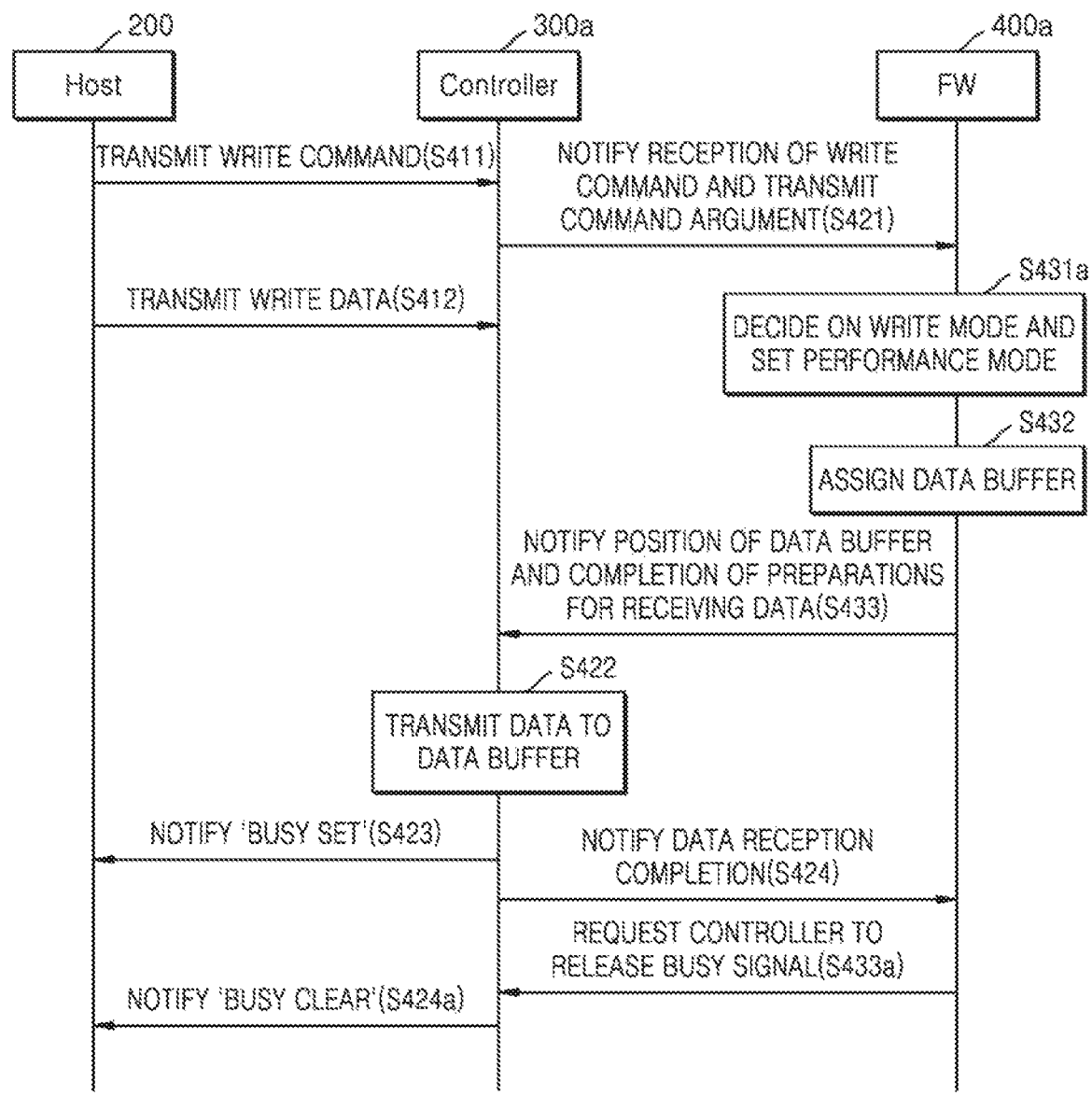
FIGS. 13A and 13B are flowcharts of a method of operating a storage device according to an embodiment of the present invention.
Figure 13B:
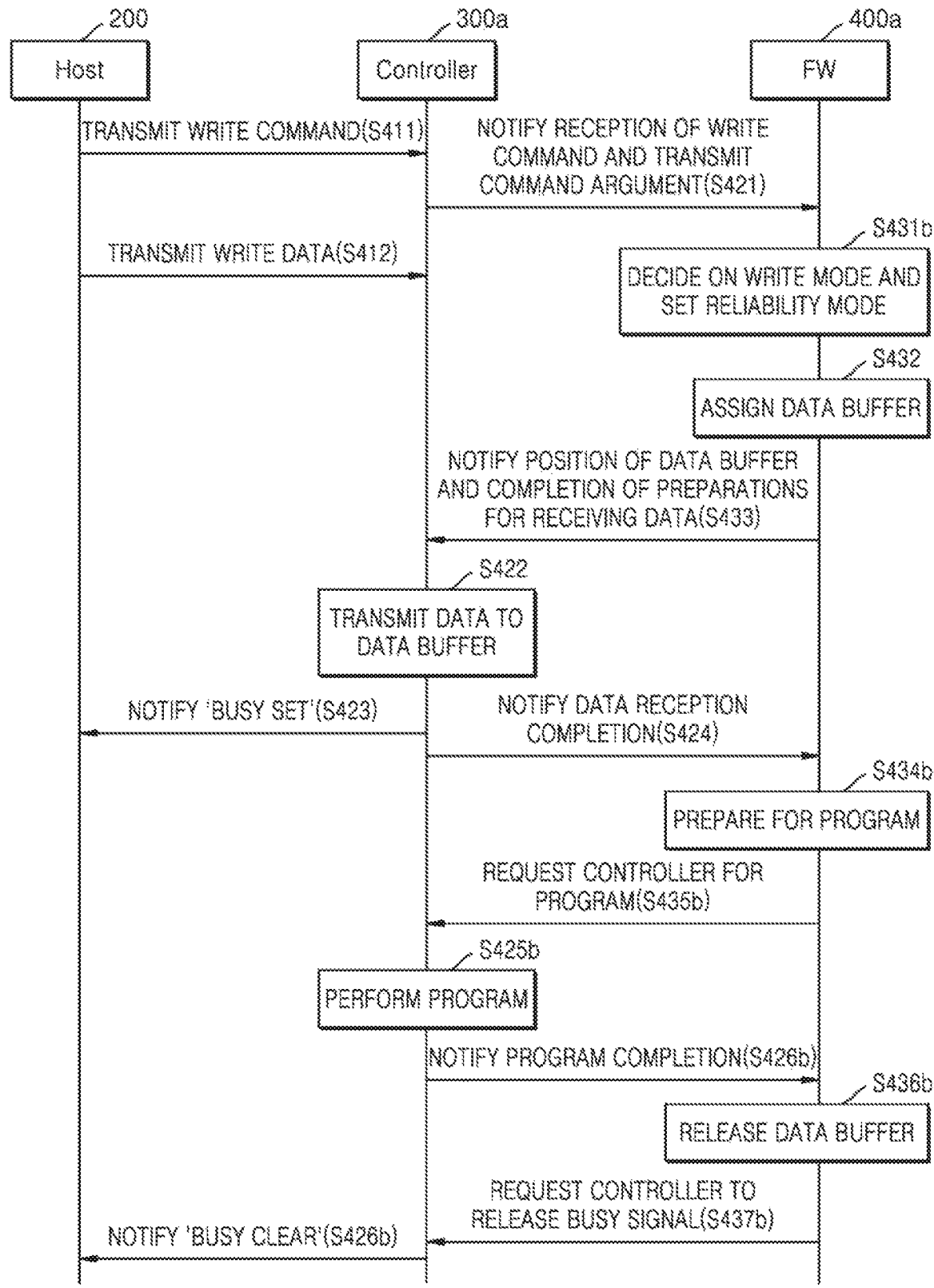

FIGS. 13A and 13B are flowcharts of a method of a storage device according to an embodiment of the present invention. FIG. 13A illustrates a case in which a write mode is set as a performance mode, and FIG. 13B illustrates a case in which the write mode is set as a reliability mode. The method of operating the storage device shown in FIGS. 13A and 13B may be performed in the storage device 100a of FIG. 12. A controller 300a, which is hardware, may include the host interface 40a, the memory 50, and the non-volatile memory interface 60 of FIG. 12, and firmware 400a may include an FTL 70a of FIG. 12. The firmware 400a may include a write mode decision unit 10a and a state manager 20a.

Referring to FIG. 13A, when a host 200 transmits a write command to the controller 300a (S411), the controller 300a may notify the firmware 400a that the write command is received, and transmit a command argument to the firmware 400a (S421).

The firmware 400a may decide on a performance mode to be the write mode and set a performance mode (S431a).

After transmitting the write command (S411), the host 200 may transmit write data to the controller 300a (S412). The firmware 400a may assign the data buffer (e.g., 52 in FIG. 12) in which the write data is to be stored (S432). In other words, the firmware 400a may designate a position (region) of the data buffer in which the write data is to be stored. The firmware 400a may notify the controller 300a of a position of the assigned data buffer 52 and the completion of preparations for receiving data (S433). The controller 300a may transmit the received write data to the assigned data buffer 52 (S422). In other words, the controller 300a may store the write data in the data buffer 52.

When the reception of the write data is completed and the received write data is stored in the data buffer 52, the controller 300a may notify the firmware 400a that data reception has been completed (S424). The controller 300a may also set a busy signal and notify the host 200 of 'busy set' (S423).

Since the write mode as the performance mode, the firmware 400a may change the operation state from the receive-data state (e.g., RDS in FIG. 2) to the transfer state (e.g., TFS in FIG. 2) and request the controller 300a to release the busy signal (S433a). The controller 300a may release the busy signal upon a request of the firmware 400a and notify the host 200 of 'busy clear' (S424a).

Referring to FIG. 13B, operations S411 to S424 may be similar to operations S411 to S424 of FIG. 13A. However, when a write command reception notification and the command argument are received from the controller 300a, the firmware 400a may decide on the reliability mode to be the write mode and set the reliability mode (S431b).

Subsequently, if a data reception completion notification is received from the controller 300a, since the write mode is set as the performance mode, the firmware 400a may change the operation state from the receive-data state (e.g., RDS in FIG. 2) to the programming state (e.g., PGMS in FIG. 2) and prepare for a program (S434b). For instance, a physical address on the non-volatile memory 120 may be assigned to the firmware 400a. The firmware 400a may request the controller 300a for the program (S435b).

The controller 300a may perform the program upon a program request of the firmware 400a (S425b). The controller 300a may program write data stored in the data buffer 52 to a region of the non-volatile memory 120 corresponding to the assigned physical address.

If the program is completed, the controller 300a may notify the firmware 400a of program completion (S426b). The firmware 400a may release the assigned data buffer (S436b). A region of the data buffer in which write data has been stored may be a free region, and different data may be stored in the free region. Thereafter, the firmware 400a may change the operation state from the programming state PDMS to the transfer state TFS and request the controller 300a to release a busy signal (S431b). The controller 300a may release the busy signal upon the request of the firmware 400a and notify the host 200 of 'busy clear' (S426b).

Figure 14:
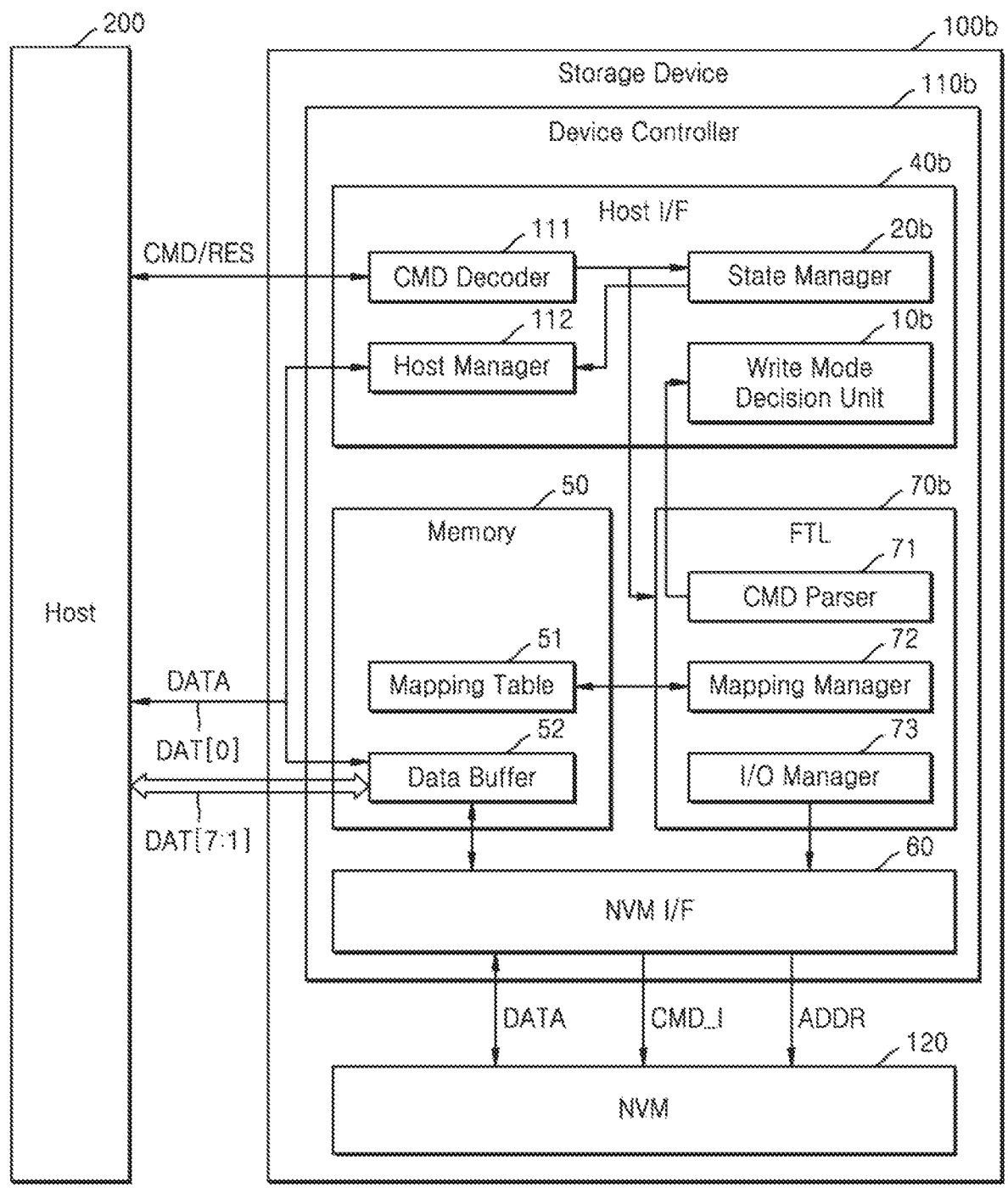
FIG. 14 is a detailed block diagram of a storage device according to an embodiment of the present invention.

FIG. 14 is a detailed bock diagram of a storage device 100b according to an embodiment of the present invention. Referring to FIG. 14, the storage device 100b may include a device controller 110b and a non-volatile memory 120, and the device controller 110b may include an FTL 70b, a memory 50, a host interface 40b, and a non-volatile memory interface 60. The storage device 100b may correspond to an embodied example of the storage device 100 of FIG. 1, and the device controller 110b may correspond to an embodied example of the device controller 110 of FIG. 4. Accordingly, descriptions presented above with reference to FIGS. 1 and 4 may also be applied to the present embodiment.

Components of the storage device 100b and operations thereof may be similar to components of the storage device 100a described with reference to FIG. 12 and operations thereof. Accordingly, differences between the storage device 100b and the storage device 100a will mainly be described.

Referring to FIG. 14, a write mode decision unit 10b and a state manager 20b may be embodied by hardware and included in the host interface 40c. Accordingly, the host interface 40c (e.g., hardware) may decide on a write mode, decide on an operation state, and request a host manager 112 to release a busy signal. In an embodiment, the command decoder 111 may confirm the integrity of received write data. After the reception of the write data is completed, the state manager 20b may decide on the operation state, based on the write mode decided by the write mode decision unit 10b and the integrity of the write data, and request the host manager 112 to release the busy signal.

Figure 15A:
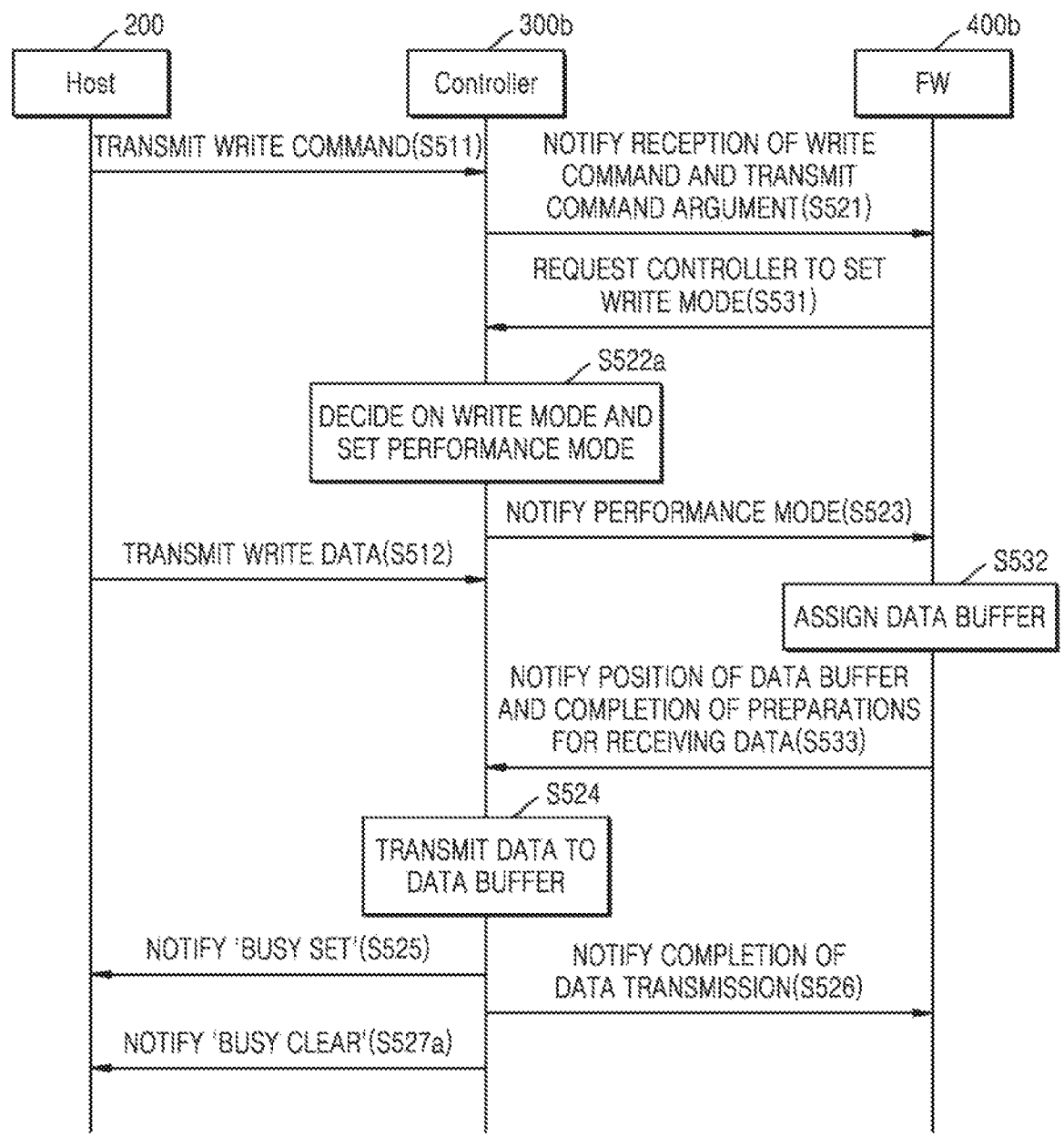
FIGS. 15A and 15B are flowcharts of a method of operating a storage device according to an embodiment of the present invention.
Figure 15B:
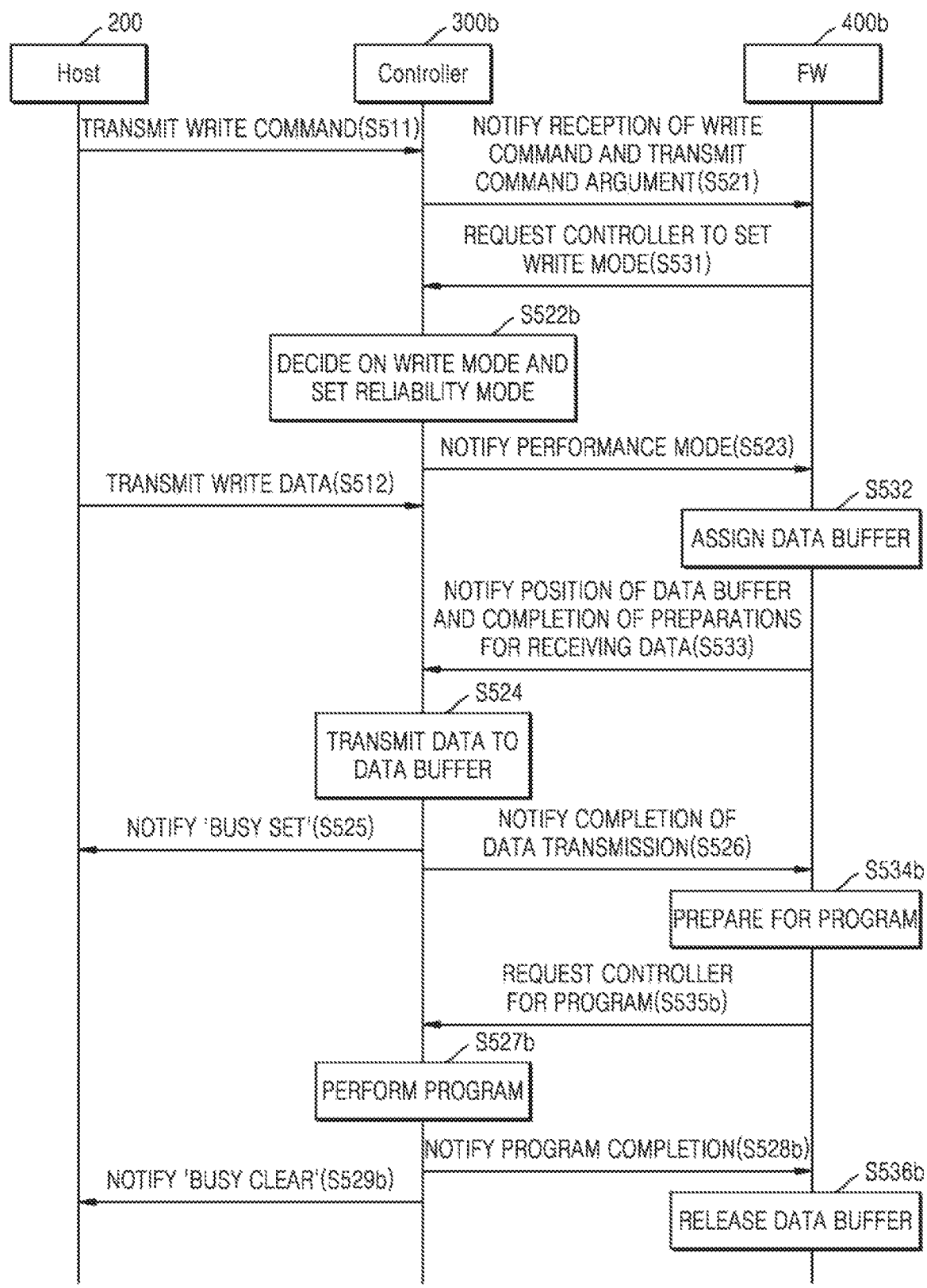

FIGS. 15A and 15B are flowcharts of a method of operating a storage device according to an embodiment of the present invention. FIG. 15A illustrates a case in which a write mode is set as a performance mode, and FIG. 15B illustrates a case in which the write mode is set as a reliability mode. The method of operating the storage device shown in FIGS. 15A and 15B may be performed in the storage device 100b of FIG. 14. A controller 300b, which is hardware, may include the host interface 40b, the memory 50, and the non-volatile memory interface 60 of FIG. 14, and firmware 400b may include an FTL 70b of FIG. 14. The controller 300b may include a write mode decision unit 10b and a state manager 20b.

Referring to FIG. 15A, when a host 200 transmits a write command to the controller 300b (S511), the controller 300b may notify the firmware 400b that the write command is received, and transmit a command argument to the firmware 400b (S521).

The firmware 400b may request the controller 300b to set a write mode (S531). The controller 300b may decide on a performance mode to be the write mode and set the performance mode upon a write-mode setting request (S522a). The controller 300b may notify the firmware 400b that the write mode has been set as the performance mode (S523).

After transmitting the write command (S511), the host 200 may transmit write data to the controller 300b (S512). The firmware 400b may assign the data buffer (e.g., 52 in FIG. 14) in which write data is to be stored (S532). The firmware 400b may notify the controller 300b of a position of the assigned data buffer 52 and the completion of preparations for receiving data (S533). The controller 300b may transmit the received write data to the assigned data buffer 52 (S524). In other words, the controller 300b may store write data in the data buffer 52.

When the reception of the write data is completed, and the received write data is stored in the data buffer 52, the controller 300b may notify the firmware 400b of completion of data reception. The controller 300b may also set a busy signal and notify the host 200 of 'busy set' (S525).

Since the write mode is set as the performance mode, the controller 300b may change the operation state from the receive-data state (e.g., RDS in FIG. 2) to the transfer state (e.g., TFS in FIG. 2) to release the busy signal, and notify the host 200 of 'busy clear' (S527a).

Referring to FIG. 15B, operations S511 to S526 may be similar to operations S511 to S526 of FIG. 15A. However, when the controller 300b receives a write mode setting request from the firmware 400b, the controller 300b may decide on the reliability mode to be the write mode and set the reliability mode (S522b).

Subsequently, when a data reception completion notification is received from the controller 300b, the firmware 400b may prepare for a program (S534b), and request the controller 300a for the program (S535b).

The controller 300b may perform the program upon a program request of the firmware 400b (S527b). When the program is completed, the controller 300b may notify the firmware 400b of completion of the program (S528b). The controller 300b may change the operation state from the programming state PGMS to the transfer state TFS and release the busy signal to notify the host 200 of 'busy clear' (S529b). The firmware 400b may release the assigned data buffer (S536b).

Figure 16:
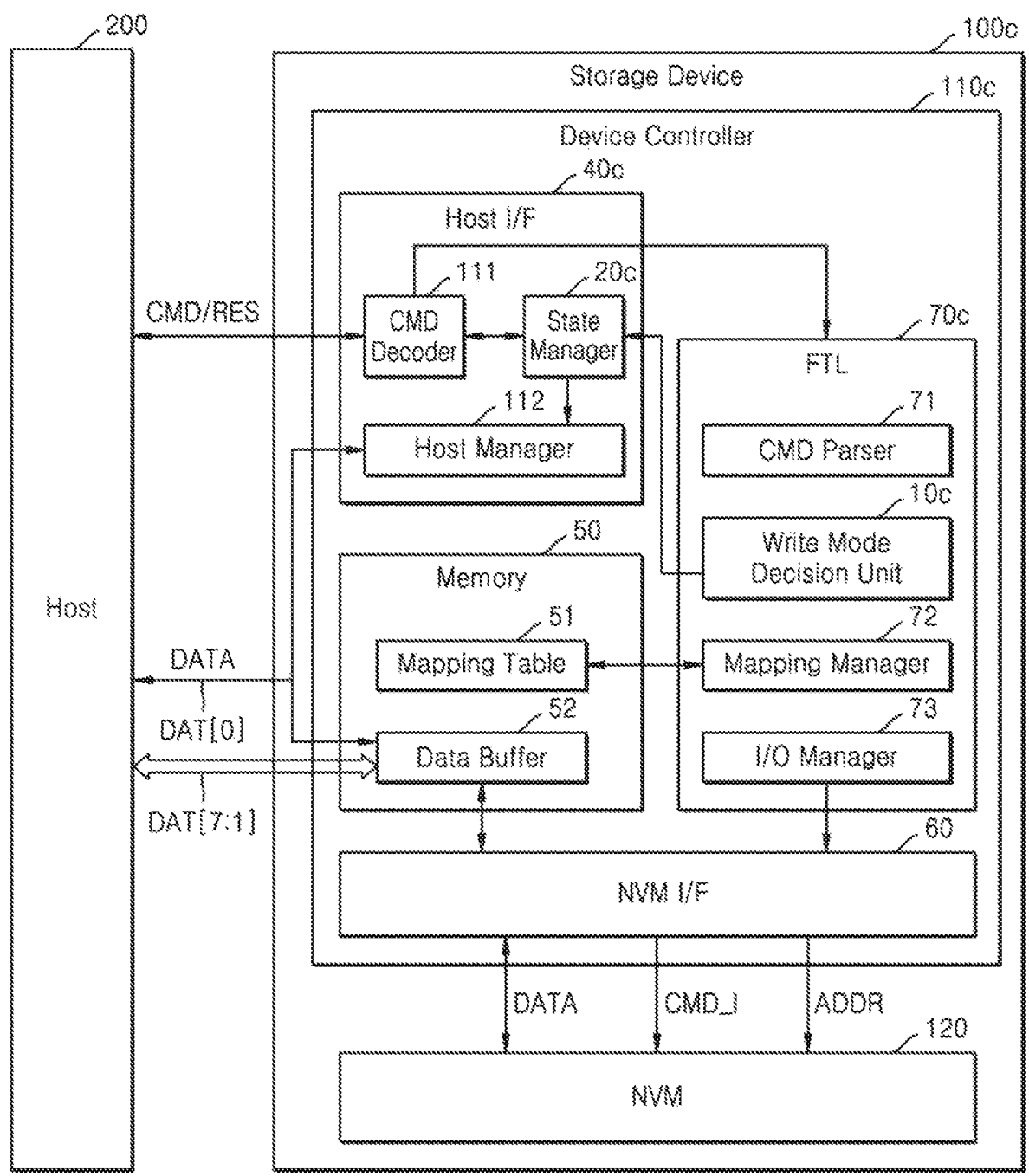
FIG. 16 is a detailed block diagram of a storage device according to an embodiment of the present invention.

FIG. 16 is a detailed block diagram of a storage device 100c according to an embodiment of the present invention.

Referring to FIG. 16, the storage device 100c may include a device controller 110c and a non-volatile: memory 120, and the device controller 110c may include an FTL 70c, a memory 50, a host interface 40c, and a non-volatile memory interface 60. The storage device 100c may correspond to an embodied example of the storage device 100 of FIG. 1, and the device controller 110c may correspond to an embodied example of the device controller 110 of FIG. 4. Accordingly, descriptions presented above with reference to FIGS. 1 and 4 may also be applied to the present embodiment.

Components of the storage device 100c and operations thereof may be similar to components of the storage device 100a described with reference to FIG. 12 and operations thereof. Accordingly, differences between the storage device 100c and the storage device 100a will mainly be described.

Referring to FIG. 16, a write mode decision unit 100 may be embodied by firmware, and a state manager 20c may be embodied by hardware. The write mode decision unit 10c may be included in the FTL 70c, and the state manager 20c may be included in the host interface 40c. Accordingly, the FTL 70c (e.g., firmware) may decide on a write mode, and the host interface 40c (e.g., hardware) may decide on an operation state and request a host manager 112 to release a busy signal.

Figure 17A:
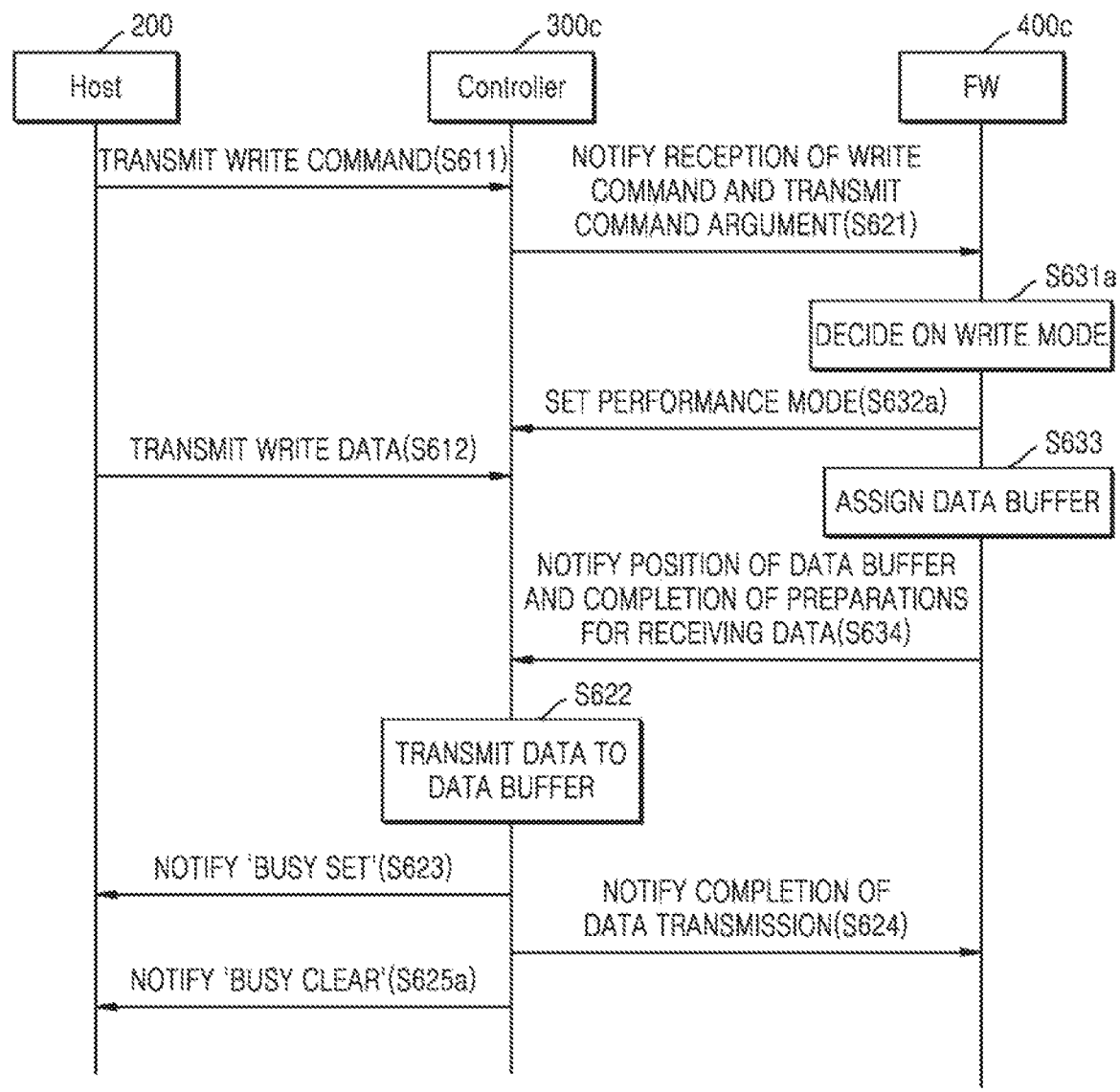
FIGS. 17A and 17B are flowcharts of a method of operating a storage device according to an embodiment of the present invention.
Figure 17B:
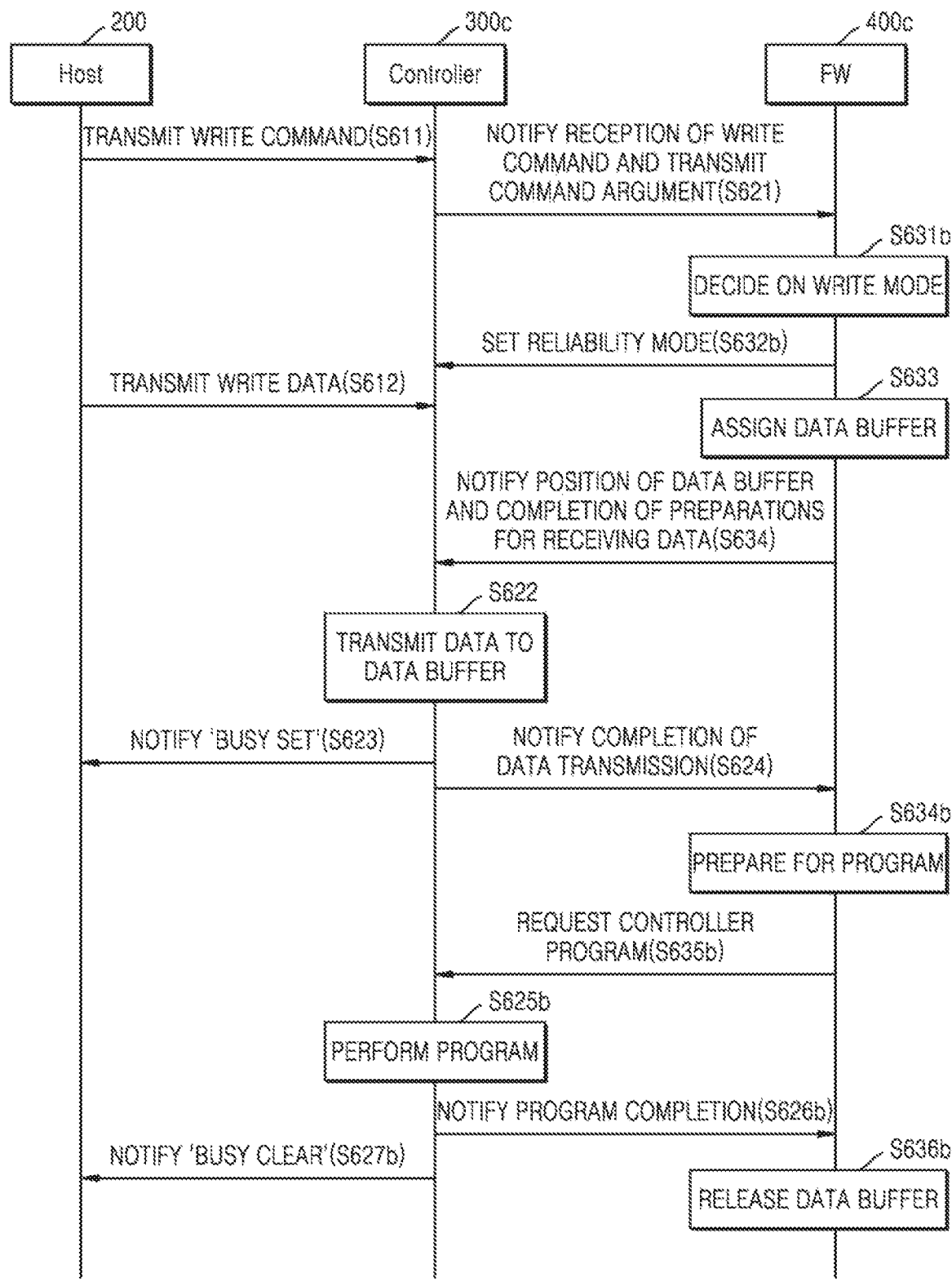

FIGS. 17A and 17B are flowcharts of a method of operating a storage device according to an embodiment of the present invention. FIG. 17A illustrates a case in which a write mode is set as a performance mode, and FIG. 17B illustrates a case in which the write mode is set as a reliability mode. The method of operating the storage device shown in FIGS. 17A and 17B may be performed in the storage device 100c of FIG. 15. A controller 300c, which is hardware, may include the host interface 40c, the memory 50, and the non-volatile memory interface 60 of FIG. 15, and firmware 400c may include an FTL 70c of FIG. 15. The controller 300c may include a state manager 20b, and the firmware 400c may include a write mode decision unit 10c.

Referring to FIG. 17A, when the host 200 transmits a write command to the controller 300c (S611), the controller 300c may notify the firmware 400c that the write command is received, and transmit a command argument to the firmware 400c (S621).

The firmware 400c may decide on a performance mode to be the write mode (S631a), notify the controller 300c of the performance mode, and set the performance mode (S632a).

After transmitting the write command (S611), the host 200 may transmit write data to the controller 300c (S612). The firmware 400c may assign the data buffer (e.g., 52 in FIG. 14) in which the write data is to be stored (S633). The firmware 400c may notify the controller 300c of a position of the assigned data buffer 52 and the completion of preparations for receiving data (S634). The controller 300c may transmit the received write data to the assigned data buffer 52 (S622).

When the reception of the write data is completed, and the received write data is stored in the data buffer 52, the controller 300c may notify the firmware 400c of completion of data reception (S624). The controller 300c may also set a busy signal and notify the host 200 of 'busy set' (S623).

Since the write mode is set as the performance mode, the controller 300c may change the operation state from the receive-data state (e.g., RDS FIG. 2) to the transfer state (e.g., TFS in FIG. 2) to release the busy signal, and notify the host 200 of 'busy clear' (S625a).

Referring to FIG. 17B, operations S611 to S624 may be similar to operations S611 to S624 of FIG. 17A. However, the firmware 400c may decide on the reliability mode to be the write mode and notify the controller 300c of the reliability mode to set the reliability mode (S632b).

Thereafter, when a data reception completion notification is received from the controller 300c, the firmware 400c may prepare for a program (S634b), and request the controller 300c for the program (S635b).

The controller 300b may perform the program upon a program request of the firmware 400b (S625b). When the program is completed, the controller 300b may notify the firmware 400c of program completion (S626b). The controller 300c may change the operation state from the programming state PGMS to the transfer state TFS and release the busy signal to notify the host 200 of 'busy clear' (S624b). The firmware 400c may release the assigned data buffer (S636b).

Figure 18:
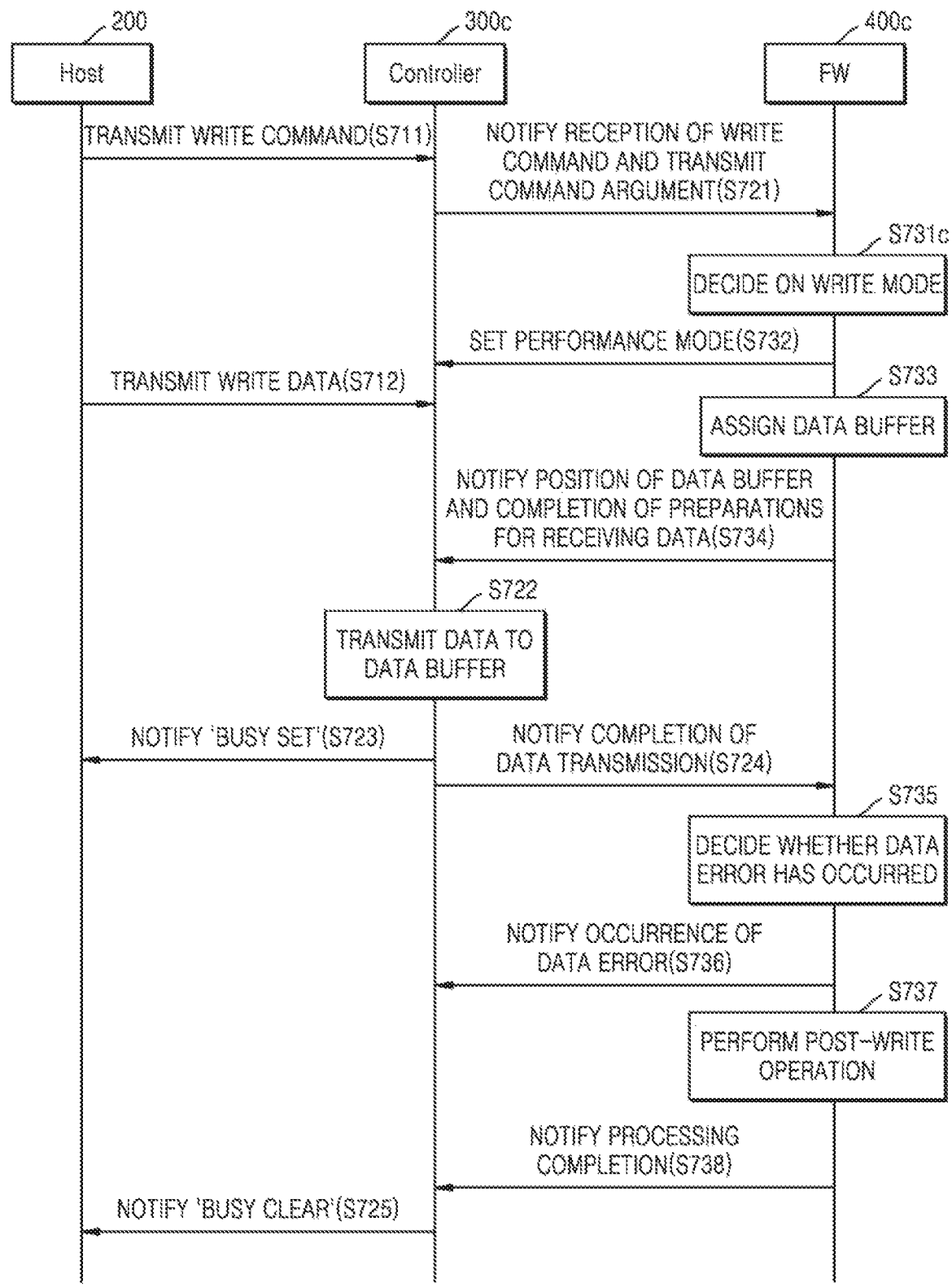
FIG. 18 is a flowchart of a method of operating a storage device according to an embodiment the present invention.

FIG. 18 is a flowchart of a method of operating a storage device according to an embodiment of the present invention. The method of operating the storage device shown in FIG. 18 may be performed in the storage device 100c of FIG. 15 and refer to a method of operating a storage device when a data error occurs in received write data. As described above with reference to FIGS. 17A and 17B, a controller 300c may include a state manager 20b, and firmware 400c may include a write mode decision unit 10c. Accordingly, the firmware 400c may decide on a write mode, and the controller 300c may decide on an operation state and notify a host 200 of 'busy set' or 'busy clear'.

Since operations S711 to S723 of FIG. 18 are the same as operations S611 to S623 of FIG. 17A, repeated descriptions thereof will be omitted.

If a data transmission completion notification is received from the controller 300c, the firmware 400c may decide whether a data error has occurred in the received write data (S735). For example, the controller 300c may detect and correct the error based on a CRC included in the write data. When an uncorrectable error is detected from the write data, the controller 300c may decide that the error has occurred. The firmware 400c may notify the controller 300c of the occurrence of the data error (S736), and perform a post-write operation (S737). The firmware 400c may process write data or perform an operation of notifying the host 200 of the occurrence of the error later.

When the post-write operation is completed, the firmware 400c may notify the controller 300c of the processing completion (S738). When a processing completion notification is received from the firmware 400c, the controller 300c may notify the host 200 of 'busy clear' (S725). For example, when a data error occurrence notification is received from the firmware 400c, after a processing completion notification is received from the controller 300c, the controller 300c may change the operation state to the transfer state (e.g., TFS in FIG. 2) and release a busy signal.

The present embodiment illustrates a case in which the firmware 400c decides whether a data error occurs, but the embodiments of the present invention are not limited thereto. In an embodiment, the controller 300c may decide whether the data error occurs, and request the firmware 400c to perform a post-write operation. In an exemplary embodiment, the controller 300c and the firmware 400c may decide together whether the data error occurs, and share a decision result therebetween.

Figure 19:
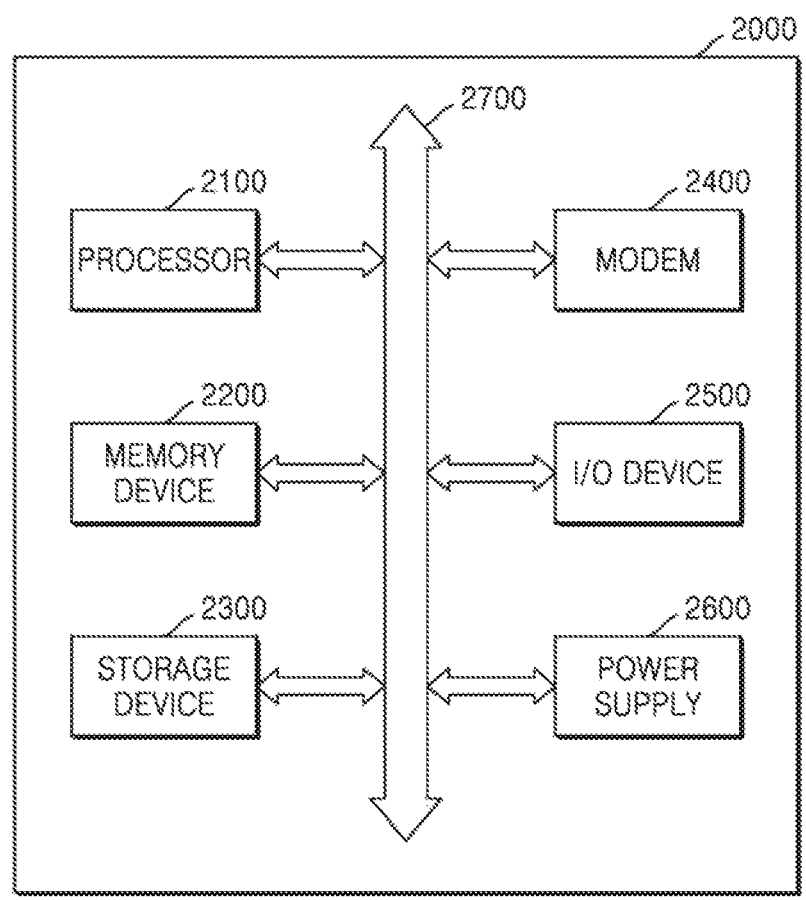
FIG. 19 is a block diagram of an electronic device according to an embodiment of the present invention.

FIG. 19 is a block diagram of an electronic device 2000 according to an embodiment of the present invention.

Referring to FIG. 19, the electronic device 2000 may include a processor 2100, a memory device 2200, a storage device 2300, a modem 2400, an I/O device 2500, and a power supply 2600. In the present embodiment, the storage device 2300 may decide on a write mode depending on whether a cache function is activated and based on a write command, and select the next operation state based on the write mode when the reception of write data is completed.

The storage device 2300 may include a non-volatile memory. When the write mode is a reliability mode in which the storing of the write data in the non-volatile memory is ensured, after the reception of the write data is completed, the storage device 2300 may enter into a programming state and set a busy signal. After the programming of the write data is completed, the storage device 2300 may enter into a transfer state and release the busy signal.

When the write mode is a performance mode in which the storing of the write data in the non-volatile memory is not ensured, after the reception of the write data is completed, the storage device 2300 may enter the transfer state and release the busy signal.

Descriptions presented above with reference to FIGS. 1 to 18 can be applied to the storage device 2300. The storage device 2300 can adaptively control a change of operation state depending on whether the integrity of write data is required, thus improving write reliability and write performance.

While the embodiments of the present invention have been particularly shown and described with reference to embodiments thereof, it will be understood that various changes in form and details may be made therein without departing from the spirit and scope of the following claims.

What is claimed is:

1. A method of operating a storage device comprising a non-volatile memory, the method comprising:
  receiving, by the storage device, a write command from a host in a first state of the storage device;
  deciding, by the storage device, a write mode of the storage device based on an operation mode of the storage device and write information included in the write command, the operation mode indicates whether a cache function is activated and the write information indicates whether the write command requires programming on the non-volatile memory;
  transitioning, by the storage device, an operation state of the storage device from the first state to a second state;
  receiving, by the storage device, write data from the host in the second state of the storage device; and
  transitioning, by the storage device, the operation state of the storage device from the second state to one of the first state and a third state based on the write mode,
  wherein the first state is operative to receive the write command, the second state is operative to receive the write data, and the third state is operative to program the received write data to the non-volatile memory.

2. The method of claim 1, further comprising transmitting to the host a state signal indicating a state capable of receiving another write command after the operation state is transitioned to the first state from the second state.

3. The method of claim 1, further comprising programming the write data to the non-volatile memory after the operation state is transitioned to the third state from the second state.

4. The method of claim 1, further comprising deciding on one of a first write mode or a second write mode to be the write mode based on a condition including at least one of whether a cache function is activated, whether the write command is received without a defect, and information provided by the write command,
  wherein the first write mode is a mode in which the storing of the write data in the non-volatile memory is not ensured, and the second write mode is a mode in which the storing of the write data in the non-volatile memory is ensured.

5. The method of claim 4, wherein the transitioning of the operation state comprises:
  transitioning the operation state to the first state when the write mode is the first write mode, and
  transitioning the operation state to the third state when the write mode is the second write mode.

6. The method of claim 4, wherein the deciding of the write mode comprises deciding on the first write mode to be the write mode when the storage device operates in a cache-on mode in which the cache function is activated.

7. The method of claim 4, wherein the deciding of the write mode comprises deciding on the second write mode to be the write mode when the storage device operates in a cache-off mode in which the cache function is inactivated or when the write command received requests a forced program.

8. The method of claim 4, wherein the deciding of the write mode comprises deciding on the first write mode to be the write mode when a mode set command requests a cache-on mode in which data integrity is not ensured and the write command received without a defect does not request a forced program.

9. The method of claim 4, wherein the deciding of the write mode is based on the condition that further includes whether a data error occurs in the write data.

10. The method of claim 1, wherein the transitioning of the operation state comprises transitioning the operation state to the third state when a data error occurs in the write data.

11. The method of claim 1, wherein the storage device is an embedded multimedia card (eMMC).

12. A storage device comprising:
  a non-volatile memory; and
  a device controller configured to decide on a write mode of the storage device based on an operation mode of cache-on or cache-off and whether a write command requires programming on the non-volatile memory after receiving the write command from a host, and decide whether to enter into a programming state in which data is written to the non-volatile memory after receiving a write data from the host based on the write mode.

13. The storage device of claim 12, wherein the device controller comprises:
  a mode decision unit configured to decide on one of a reliability mode and a performance mode to be the write mode, based on the condition including at least one of the operation mode and the write command received; and
  a state manager configured to decide on one of a transfer state in which the write command is received, a receive-data state in which write data is received, and the programming state to be an operation state in a write operation, and change the operation state into one of the transfer state and the programming state when the reception of the write data is completed in the receive-data state.

14. The storage device of claim 13, wherein the device controller transmits a first state signal indicating a state capable of receiving a command to a host when the operation state is changed into the transfer state.

15. The storage device of claim 13, wherein the mode decision unit changes the operation state into the transfer state when the operation mode is a cache-on mode in which a cache function is activated and when the write command is not a forced write mode.

16. The storage device of claim 13, wherein the mode decision unit decides on the reliability mode to be the write mode when an error occurs in the write command or the write data.

17. A method of operating an embedded multimedia card (eMMC) device comprising a non-volatile memory, the method comprising:
receiving, by the eMMC, a write command from a host;
receiving, by the eMMC, write data from the host;
deciding on, by the eMMC, one of a first write mode in which the storing of the write data in the non-volatile memory is not ensured and a second write mode in which the storing of the write data in the non-volatile memory is ensured to be a write mode;
wherein when the write mode is the first write mode, transmitting, by the eMMC, a first state signal indicating a state capable of receiving another write command to the host after the reception of the write data is completed; and
wherein when the write mode is the second write mode, transmitting, by the eMMC, a second state signal indicating a state incapable of receiving the write command to the host after the reception of the write data is completed,
wherein the deciding on one of the first write mode and the second write mode is performed based on an operation mode set for the eMMC and write information included in the write command after the receiving the write command, the operation mode indicates whether a cache function is activated in the eMMC and the write information indicates whether the write command requires programming on the non-volatile memory.

18. The method of claim 17, wherein the deciding on one of the first write mode or the second write mode is performed before the receiving of the write data.

19. The method of claim 17, wherein the deciding on one of the first write mode or the second write mode is further performed after the receiving of the write data only if a data error occurs in the write data.

* * * * *